(12) United States Patent
Favaro et al.

(10) Patent No.: US 9,976,248 B2
(45) Date of Patent: May 22, 2018

(54) WATER SUPPLY ASSEMBLY FOR LAUNDRY WASHING MACHINE

(71) Applicant: Electrolux Appliances Aktiebolag, Stockholm (SE)

(72) Inventors: Daniele Favaro, Venice (IT); Maurizio Del Pos, Pordenone (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 0 days. days.

(21) Appl. No.: 15/125,723

(22) PCT Filed: Apr. 1, 2014

(86) PCT No.: PCT/EP2014/056538
§ 371 (c)(1),
(2) Date: Sep. 13, 2016

(87) PCT Pub. No.: WO2015/149845
PCT Pub. Date: Oct. 8, 2015

(65) Prior Publication Data
US 2017/0016165 A1    Jan. 19, 2017

(51) Int. Cl.
*D06F 39/08* (2006.01)
*D06F 39/00* (2006.01)
(Continued)

(52) U.S. Cl.
CPC .............. *D06F 39/088* (2013.01); *C02F 1/42* (2013.01); *D06F 33/02* (2013.01); *D06F 37/304* (2013.01);
(Continued)

(58) Field of Classification Search
CPC ...... D06F 33/02; D06F 37/304; D06F 39/007; D06F 39/028; D06F 39/088
See application file for complete search history.

(56) References Cited

U.S. PATENT DOCUMENTS

2005/0188729 A1* 9/2005 Zsambeki ............. D06F 39/028
68/12.18
2009/0119849 A1* 5/2009 Hill ........................ D06F 39/028
8/158

(Continued)

FOREIGN PATENT DOCUMENTS

EP    0861114 A1    9/1998
EP    2562303 A2    2/2013
(Continued)

OTHER PUBLICATIONS

International Search Report issued in corresponding International Application No. PCT/EP2014/056538, dated Jun. 3, 2014.

*Primary Examiner* — Joseph L. Perrin
(74) *Attorney, Agent, or Firm* — RatnerPrestia

(57) ABSTRACT

A water supply assembly (1) for laundry washing machines (100) provided with a detergent drawer (115) structured for receiving a given amount of detergent, softener or other washing agent and fitted in an extractable manner into a corresponding drawer housing (116). The water supply assembly (1) structured for selectively pouring the water arriving from the fresh-water supply circuit (108) of the laundry washing machine (100) into the detergent drawer (115) so as to selectively flush the detergent, softener or other washing agent out of the same detergent drawer (115).

26 Claims, 12 Drawing Sheets

(51) Int. Cl.
  *D06F 33/02* (2006.01)
  *D06F 37/30* (2006.01)
  *D06F 39/02* (2006.01)
  *C02F 1/42* (2006.01)
  *C02F 101/10* (2006.01)

(52) U.S. Cl.
  CPC .......... *D06F 39/007* (2013.01); *D06F 39/028* (2013.01); *C02F 2101/10* (2013.01); *C02F 2303/22* (2013.01); *C02F 2307/12* (2013.01)

(56) References Cited

U.S. PATENT DOCUMENTS

| | | | |
|---|---|---|---|
| 2012/0060568 A1* | 3/2012 | Buso | D06F 39/02 68/17 R |
| 2013/0047678 A1* | 2/2013 | Lee | D06F 39/028 68/13 R |
| 2014/0157835 A1* | 6/2014 | Del Pos | D06F 39/007 68/17 R |
| 2014/0157836 A1* | 6/2014 | Zattin | D06F 39/007 68/17 R |
| 2014/0165665 A1* | 6/2014 | Del Pos | D06F 39/02 68/200 |
| 2014/0165666 A1* | 6/2014 | Del Pos | D06F 39/007 68/200 |
| 2015/0107309 A1* | 4/2015 | Favaro | D06F 39/007 68/17 R |
| 2015/0107310 A1* | 4/2015 | Del Pos | D06F 39/028 68/17 R |
| 2015/0368846 A1* | 12/2015 | Del Pos | D06F 39/005 68/17 R |

FOREIGN PATENT DOCUMENTS

| | | |
|---|---|---|
| WO | 2006079417 A1 | 8/2006 |
| WO | 2013160211 A1 | 10/2013 |

* cited by examiner

WATER SUPPLY ASSEMBLY FOR LAUNDRY WASHING MACHINE

CROSS REFERENCE TO RELATED APPLICATIONS

This application is a national stage application filed under 35 U.S.C. 371 of International Application No. PCT/EP2015/056538, filed Apr. 1, 2014, which is incorporated by reference herein in its entirety.

FIELD

The present invention relates to a water supply assembly for laundry washing machines.

More in particular, the present invention relates to a drawer flush circuit to be incorporated into the detergent dispenser of a front-loading home laundry washing machine, use to which the following description refers purely by way of example without implying any loss of generality.

BACKGROUND

As is known, a front-loading home laundry washing machine generally comprises: a substantially parallelepiped-shaped outer boxlike casing structured for resting on the floor; a substantially horizontally-oriented and approximately cylindrical washing tub which is usually suspended in floating manner inside the casing, with the mouth directly facing a laundry loading/unloading through opening realized in the front wall of the casing; a substantially cylindrical, cup-shaped rotatable drum structured for housing the laundry to be washed, and which is fitted inside the washing tub with the concavity facing the laundry loading/unloading opening, and is supported by the washing tub in axially rotatable manner so as to be able to freely rotate inside the washing tub about its substantially horizontally-oriented, longitudinal axis; a substantially cylindrical, elastically-deformable bellows which watertight connects the front mouth of the washing tub to the laundry loading/unloading opening formed in the front wall of the casing; a porthole door which is hinged to the front wall of the casing to rotate to and from a closing position in which the door closes the laundry loading/unloading opening in the front wall of the casing for watertight sealing the washing tub; and an electrically-powered motor assembly which is structured for driving into rotation the rotatable drum about its longitudinal axis inside the washing tub.

The front-loading home laundry washing machine moreover comprises: a detergent dispenser which is located inside the boxlike casing and is structured for selectively feeding into the washing tub, according to the washing cycle manually selected by the user, a given amount of detergent, softener and/or other washing agent suitably mixed with fresh water arriving from the water mains; and finally a fresh-water supply circuit which is structured for selectively drawing fresh water from the water mains according to the washing cycle manually-selected by the user, and channeling said fresh water to the detergent dispenser or directly to the washing tub.

In most of the front-loading laundry washing machines currently on the market, the detergent dispenser generally comprises a detergent drawer which is fitted/inserted in manually extractable manner into a corresponding, substantially basin-shaped, drawer housing whose entrance is located on front wall of the casing, above the laundry loading/unloading opening. The detergent drawer is moreover divided into a number of detergent compartments each structured for being manually fillable with an amount of detergent, softener or other washing agent sufficient to perform a single washing cycle, and the detergent dispenser furthermore comprises a drawer flush circuit which is connected to the fresh-water supply circuit and is structured for selectively pouring, when the detergent drawer is completely fitted/inserted into the drawer housing, a shower of water droplets directly into any one of the detergent compartments of the detergent drawer, so as to selectively flush the detergent, softener or other washing agent out of the same detergent compartment and down onto the bottom of the drawer housing. The mixture of water and detergent, softener or other washing agent afterwards flows into the washing tub via a drain duct that branches off from the bottom of the drawer housing.

The drawer flush circuit in turn basically consists in a plate-like water delivery member which is structured to form the upper lid or cover of the basin-shaped drawer housing, so as to be located immediately above the detergent drawer when the latter is completely inserted/recessed into the same drawer housing, and is directly connected to the fresh-water supply circuit for receiving the fresh water of the water mains. The plate-like water delivery member is moreover provided with a number of shower-making portions, each of which is vertically aligned to a corresponding detergent compartment of the detergent drawer and is structured for feeding a shower of water droplets by gravity into the detergent compartment located immediately beneath, and internally accommodates a rotatable flow diverter which is interposed between the water inlet of the plate-like water delivery member and a number of internal water channels each ending into a corresponding shower-making portion of the plate-like water delivery member. The rotatable flow diverter is structured to selectively and alternatively channel the fresh water arriving from the fresh-water supply circuit towards any one of the internal water channels of the water delivery member.

The drawer flush circuit furthermore comprises a small electrically-operated motor assembly which is generally attached on a side of the plate-like water delivery member, and is mechanically connected to the rotatable flow diverter for controlling the angular position of the flow diverter.

EP2562303 discloses a drawer flush circuit wherein the pivot shaft of the rotatable flow diverter is mechanically connected to the electric motor assembly via a series of toothed wheels housed inside a separate gear case attached to the upper face of the plate-like water delivery member.

Unluckily this kind of drawer flush circuit is extremely difficult to be used in the new laundry washing machines provided with an internal water softening unit that uses ion-exchange resins to restrain calcium and magnesium ions (Ca++ and Mg++) dissolved in the tap water channeled to the washing tub, and brine (i.e. salt water) to periodically regenerate these ion-exchange resins. A front-loading laundry washing machine having an internal water softening unit of the type referred above is disclosed in WO2013/160211.

SUMMARY OF SELECTED INVENTIVE ASPECTS

An aim of aspects of the present invention is therefore to realize a drawer flush circuit suitable to be incorporated into the new laundry washing machines provided with an internal water softening unit that uses ion-exchange resins to restrain calcium and magnesium ions (Ca++ and Mg++) dissolved in the tap water channeled to the washing tub, and brine (i.e. salt water) to periodically regenerate these ion-exchange resins.

In compliance with the above aims, according to aspects of the present invention there is provided a water supply assembly for laundry washing machines provided with a detergent drawer which is structured for receiving a given amount of detergent, softener or other washing agent and is fitted in extractable manner into a corresponding drawer housing; the water supply assembly being structured for selectively pouring the water arriving from a fresh-water supply circuit of the laundry washing machine into the detergent drawer so as to selectively flush the detergent, softener or other washing agent out of the same detergent drawer;

the water supply assembly being characterized by comprising: a water delivery member which forms or is associated to the upper lid of the drawer housing so as to be located above the detergent drawer when said detergent drawer is inserted/recessed into the drawer housing, and a discrete flow-diverter module which is connectable to the fresh-water supply circuit for receiving the fresh water of the water mains and is attached outside the water delivery member at a coupling socket formed on the water delivery member;

the water delivery member being provided, at said coupling socket, with a number of water inlets each separately communicating with a respective water-delivery portion of the water delivery member;

the flow-diverter module, in turn, being provided with a number of main water outlets structured to separately couple each with a respective water inlet of the water delivery member, and being structured to internally accommodate a rotatable flow diverter which is capable of selectively channeling the water entering into the flow-diverter module towards any one of said main water outlets;

the flow-diverter module being furthermore provided with a first main water inlet and with a second auxiliary water inlet both communicating with a water inlet of the rotatable flow diverter for independently channeling the fresh water of the water mains and/or other washing liquid towards a water inlet of the rotatable flow diverter.

The flow-diverter module is therefore arranged externally to the water delivery member, and is coupled to the water delivery member at the coupling socket of the water delivery member to put the main water outlets separately in communication each with a respective water inlet of the water delivery member. Preferably, the water supply assembly is furthermore characterized in that the water delivery member is substantially plate-like shaped.

Preferably, though not necessarily, the water supply assembly is furthermore characterized in that the flow-diverter module comprises: an outer casing which is separated from the water delivery member, and has an interface portion which is suitably structured to couple with the coupling socket of said water delivery member and wherein the main water outlets are located; a rotatable flow diverter which is fitted/recessed in axially rotatable manner into a hollow seat realized inside said outer casing; and an electrically-operated motor assembly which is associated to the outer casing, and is mechanically connected to the rotatable flow diverter for controlling the angular position of the flow diverter inside said hollow seat.

Preferably, though not necessarily, the water supply assembly is furthermore characterized in that the flow-diverter module furthermore comprises an electronic control unit which is housed inside the outer casing, and is structured to directly power and control the electrically-operated motor assembly according to electric signals arriving from a main electronic central control unit of the laundry washing machine.

Preferably, though not necessarily, the water supply assembly is furthermore characterized in that said first main water inlet is structured to couple/connect with the fresh-water supply circuit, and directly communicates with the hollow seat for channeling the water of fresh-water supply circuit towards the water inlet of the rotatable flow diverter.

Preferably, though not necessarily, the water supply assembly is furthermore characterized in that said auxiliary water inlet is structured to communicate with a water outlet of a water softening device of the laundry washing machine for receiving softened water.

Preferably, though not necessarily, the water supply assembly is furthermore characterized in that the water delivery member is provided with a number of first internal water channels each of which separately begins at coupling socket of the water delivery member and extends inside the body of water delivery member up to reach a corresponding water-delivery portion of the water delivery member.

Preferably, though not necessarily, the water supply assembly is furthermore characterized in that the water delivery member is provided with a supplementary water outlet, and in that the auxiliary water inlet of the flow-diverter module is structured to couple/connect with the supplementary water outlet of said water delivery member for receiving water from said water delivery member.

Preferably, though not necessarily, the water supply assembly is furthermore characterized in that the supplementary water outlet of the water delivery member is located at coupling socket; and in that the auxiliary water inlet of the flow-diverter module is located at the interface portion of the outer casing.

Preferably, though not necessarily, the water supply assembly is furthermore characterized in that the supplementary water outlet of the water delivery member communicates with a water outlet of a water softening device of the laundry washing machine for channeling softened water to the auxiliary water inlet of the flow diverter module.

Preferably, though not necessarily, the water supply assembly is furthermore characterized in that the water delivery member is provided with a second internal water channel which separately begins at coupling socket of the water delivery member, and extends inside the body of the water delivery member up to reach the water outlet of the water softening device of the laundry washing machine.

Preferably, though not necessarily, the water supply assembly is furthermore characterized in that said second internal water channel begins at the coupling socket of the water delivery member, and extends inside the body of the water delivery member up to reach a corresponding hydraulic connector located on the water delivery member and which is structured to couple with the water outlet of the water softening device of the laundry washing machine.

Preferably, though not necessarily, the water supply assembly is furthermore characterized in that the water delivery member is provided with a second internal water channel which begins at a supplementary water outlet and extends inside the body of the water delivery member up to reach a water source, preferably structured to reduce the hardness degree of the water arriving from the fresh-water supply circuit; and in that the auxiliary water inlet of the flow-diverter module is structured to couple/connect with the supplementary water outlet of said water delivery member for receiving water from said water source.

Preferably, though not necessarily, the water supply assembly is furthermore characterized in that the water delivery member is provided with a supplementary water inlet; and in that the flow-diverter module is provided with an auxiliary water outlet structured to couple/connect with the supplementary water inlet of the water delivery member, and with a second main water inlet which is structured to couple/connect with the fresh-water supply circuit, and which directly communicates with said auxiliary water outlet bypassing the rotatable flow diverter.

Preferably, though not necessarily, the water supply assembly is furthermore characterized in that the supplementary water inlet of the water delivery member is located at coupling socket; and in that the auxiliary water outlet of the flow-diverter module is located at the interface portion of the outer casing.

Preferably, though not necessarily, the water supply assembly is furthermore characterized in that the supplementary water inlet of the water delivery member communicates with a water inlet of a water softening device of the laundry washing machine for channeling the water towards said water softening device.

Preferably, though not necessarily, the water supply assembly is furthermore characterized in that the water delivery member is provided with a third internal water channel which separately begins at coupling socket of the water delivery member, and extends inside the body of the water delivery member up to reach a corresponding hydraulic connector located on the water delivery member and which is structured to couple with the water inlet of the water softening device of the laundry washing machine.

Preferably, though not necessarily, the water supply assembly is furthermore characterized in that the water delivery member is directly connected to the fresh-water supply circuit for directly receiving fresh water bypassing the flow-diverter module, and is structured to directly channel said fresh water to a water inlet of a internal water softening device of the laundry washing machine.

Preferably, though not necessarily, the water supply assembly is furthermore characterized in that the water delivery member is provided with an auxiliary hydraulic connector which is arranged spaced apart from the coupling socket and is connectable to the fresh-water supply circuit, and with a third internal water channel which begins at said auxiliary hydraulic connector and extends inside the body of the water delivery member up to reach with the water inlet of the water softening device of the laundry washing machine for channeling the fresh water towards the internal water softening device.

Preferably, though not necessarily, the water supply assembly is furthermore characterized in that the water delivery member said third internal water channel begins at said auxiliary hydraulic connector and extends inside the body of the water delivery member up to reach a further hydraulic connector which is structured to couple with the water inlet of the water softening device of the laundry washing machine.

Preferably, though not necessarily, the water supply assembly is furthermore characterized in that the electrically-operated motor assembly comprises an electric motor or similar electrically-operated driving device which is fitted/recessed into a corresponding second hollow seat realized in the outer casing, spaced apart beside the hollow seat accommodating the rotatable flow diverter, and a drive system which is structured to mechanically connect the driving shaft of the electric motor to the pivot shaft of the rotatable flow diverter for allowing the electric motor to vary/control the angular position of the flow diverter inside the corresponding hollow seat; the drive system being located into a corresponding compartment of the outer casing preferably located adjacent to the first hollow seat accommodating the rotatable flow diverter and the second hollow seat accommodating the electric motor.

Preferably, though not necessarily, the water supply assembly is furthermore characterized in that the outer casing of flow-diverter module comprises a substantially plate-like main body having, on a portion of its upper face, at least a first substantially sink-shaped cavity which is suitably shaped/structured to accommodate the rotatable flow diverter; and a plate-like upper lid which is fixed/attached to the flat portion of the upper face of said main body so as to close in watertight manner said first sink-shaped cavity to complete the hollow seat accommodating the rotatable flow diverter; the plate-like upper lid forming the interface portion of the outer casing.

Preferably, though not necessarily, the water supply assembly is furthermore characterized in that the detergent drawer is provided with a number of detergent compartments each structured for being fillable with a given amount of detergent, softener or other washing agent; and in that some water-delivery portions of the water delivery member are structured to pour, when the detergent drawer is inserted/recessed into drawer housing, the water arriving from the corresponding water inlets of the water delivery member into the detergent compartments of the detergent drawer.

Preferably, though not necessarily, the water supply assembly is furthermore characterized in that the laundry washing machine comprises a regeneration-agent drawer which is structured for being manually fillable with a given amount of consumable salt or other regeneration agent, and is fitted/inserted in manually extractable manner into the drawer housing, by the side of the detergent drawer; and in that at least one of the water-delivery portions of the water delivery member is structured to pour, when the regeneration-agent drawer is inserted/recessed into drawer housing, the water arriving from the corresponding water inlet of the water delivery member into the regeneration-agent drawer.

Preferably, though not necessarily, the water supply assembly is furthermore characterized in that the water softening device of the laundry washing machine is internally provided with a given amount of ion-exchange resins or other water softening agent which is capable of restraining the calcium and magnesium ions dissolved in the water flowing through the same water softening device.

Preferably, the laundry washing machine comprises a regeneration-agent reservoir, which is structured for being manually fillable with a given amount of consumable salt or other regeneration agent to be used in the regeneration process of the water softening agent contained into the water softening device Preferably, the regeneration-agent reservoir includes a regeneration-agent drawer which is fitted/inserted in manually extractable manner into a drawer housing, by the side of detergent drawer.

Preferably, the water supply assembly is suitably structured for selectively pouring, when the regeneration-agent drawer is completely fitted/inserted into the drawer housing, the fresh water arriving from the water mains into the regeneration-agent drawer, wherein the poured fresh water serves to gradually dissolve the salt contained into the regeneration-agent drawer to form some brine (i.e. the mixture of water and salt) adapted to flow through the regenerating the ion-exchange resins of the water softening device.

Preferably, an electric pump is adapted to selectively pump the brine (i.e. the mixture of water and salt) into the water softening device. Alternatively the brine can freely flow into the water softening device by gravity.

Preferably, though not necessarily, the water supply assembly is furthermore characterized in that the water softening device of the laundry washing machine is a flow-through capacitor.

According to aspects of the present invention there is also provided a laundry washing machine comprising an outer casing structured for resting on the floor, a washing tub housed inside the casing, a detergent dispenser which is housed inside the casing and is structured for supplying detergent into the washing tub, and a fresh-water supply circuit which is connectable to the water mains and is structured for selectively channeling the water from the water mains to said detergent dispenser; the detergent dispenser comprising a detergent drawer which is structured for receiving a given amount of detergent, softener or other washing agent and is fitted in extractable manner into a corresponding drawer housing, and a water supply assembly which is connected to the fresh-water supply circuit and is structured for selectively pouring some water into the detergent drawer so as to selectively flush the detergent, softener or other washing agent out of the same detergent drawer.

According to aspects of the present invention there is finally provided a detergent dispenser for laundry washing machines comprising one or more drawers which are structured for receiving a given amount of operating agent, and are fitted in extractable manner into a common drawer housing, and a water supply assembly structured for selectively pouring the water arriving from a fresh-water supply circuit of the laundry washing machine into the drawers so as to selectively flush the operating agent out of said detergent drawers; the detergent dispenser being characterized in that the water supply assembly comprises a plate-like water delivery member which forms, or is associated, to an upper lid of the drawer housing so as to be located above said one or more drawer when said drawer/s is/are inserted/recessed into the drawer housing, and is provided with at least one water delivery portion which is substantially vertically aligned to a funnel-shaped portion of the drawer housing which is distinct and separated from the compartment/s of drawer housing accommodating said one or more drawers, and which communicates with a water drain pipeline of the laundry washing machine; said funnel-shaped portion of the drawer housing forming an air break device which is integral to the drawer housing.

BRIEF DESCRIPTION OF THE DRAWINGS

A non-limiting embodiment of the present invention will now be described, by way of example, with reference to the accompanying drawings, in which:

FIG. 16 is a perspective view of a first alternative embodiment of the FIG. 9 flow diverter assembly, with parts removed for clarity; whereas

DETAILED DESCRIPTION OF EXAMPLE EMBODIMENTS

Figure 1:
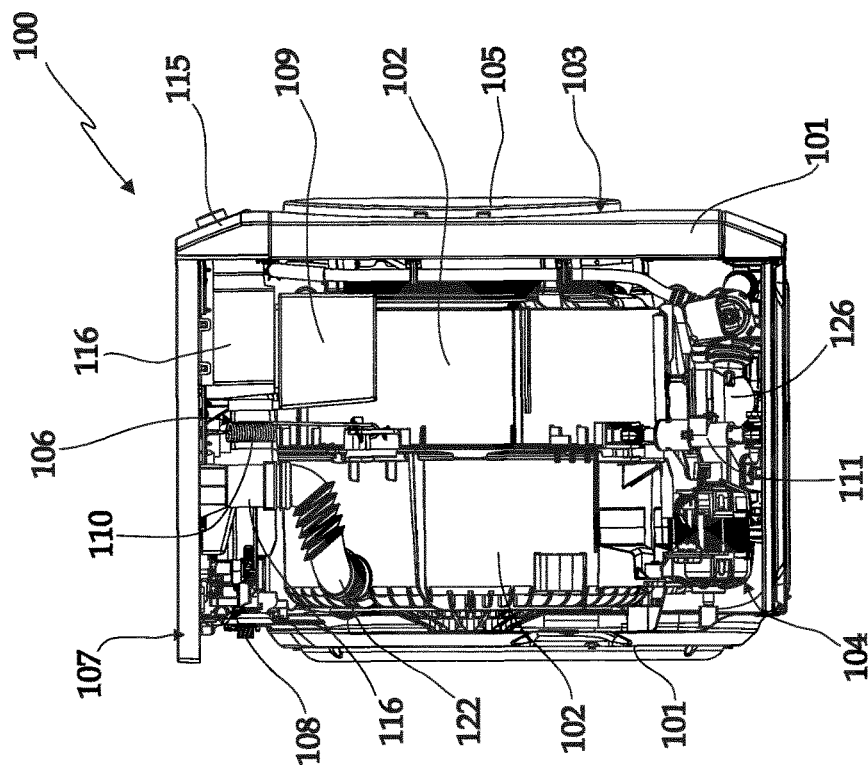
FIG. 1 is a perspective view of a laundry washing machine provided with a water supply assembly realized in accordance with the teachings of aspects of the present invention, with parts removed for clarity.
Figure 2:
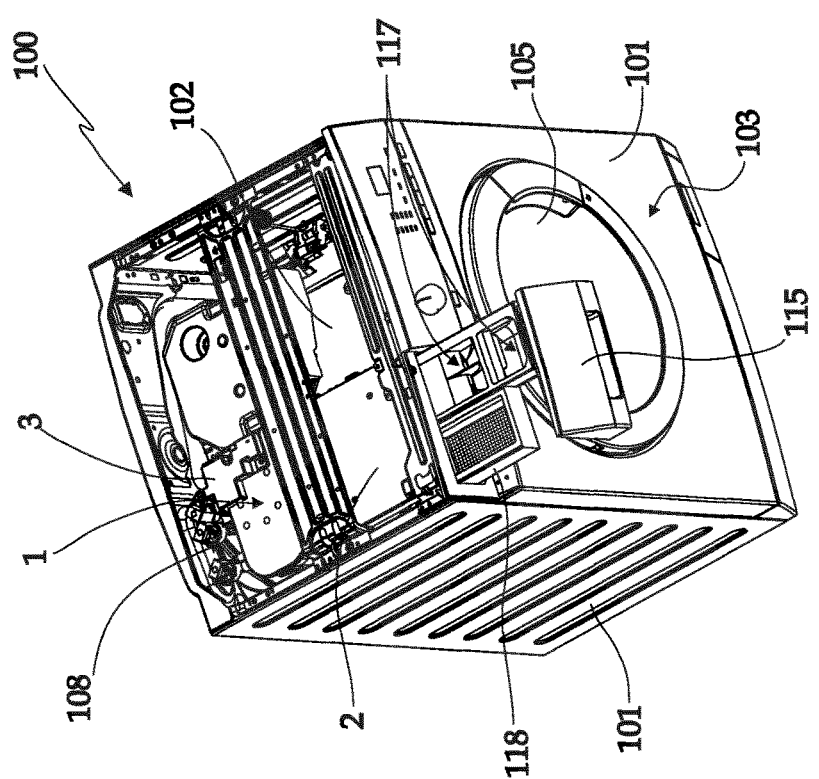
FIG. 2 is a side view of the FIG. 1 laundry washing machine, with parts removed for clarity.

With reference to FIGS. 1 and 2, reference number 1 indicates as a whole a water supply assembly suitable for being incorporated into the detergent dispenser of a laundry washing machine 100, and which is specifically structured for selectively pouring the water arriving from the fresh-water supply circuit of the laundry washing machine 100 into the detergent drawer of the detergent dispenser, so as to selectively flush the detergent, softener or other washing agent out of the same detergent drawer.

More in detail, the water supply assembly 1 is preferably structured for selectively pouring a shower of water droplets by gravity into the detergent drawer of the detergent dispenser, so as to selectively flush any detergent, softener or other washing agent out of the same detergent drawer.

In other words, the water supply assembly 1 is preferably structured for being incorporated into a home laundry washing machine 100 which preferably basically comprises:

- a preferably substantially parallelepiped-shaped, outer boxlike casing 101 structured for resting on the floor;
- a preferably substantially horizontally-oriented, approximately cylindrical washing tub 102 which is arranged inside the casing 101 with the mouth directly facing a laundry loading/unloading pass-through opening realized in the front wall 103 of the outer casing 101;
- a substantially cylindrical, cup-shaped rotatable drum (not shown) which is structured for housing the laundry to be washed, and is fitted in axially rotatable manner inside the washing tub 102 with the concavity facing the front opening or mouth of washing tub 102, so as to be able to freely rotate about its longitudinal axis inside the washing tub 102;

an electrically-powered motor assembly 104 which is structured for driving into rotation the rotatable drum (not shown) about its longitudinal axis inside the washing tub 102; and a porthole door 105 which is hinged to the front wall 103 of casing 101 so as to be movable/rotatable to and from a closing position in which the door 105 closes the laundry loading/unloading opening on front wall 103 for watertight sealing the washing tub 103.

With reference to FIGS. 1, 2, 3 and 4, the laundry washing machine 100 furthermore comprises: a detergent dispenser 106 which is located inside the casing 101 preferably above the washing tub 102 and preferably, though not necessarily, immediately underneath the upper worktop or top wall 107 of casing 101, and is structured for selectively feeding into the washing tub 102, according to the washing cycle manually-selected by the user, a given amount of detergent, softener and/or other washing agent suitably mixed with fresh water, and a fresh-water supply circuit 108 which is connectable directly to the water mains, and is structured for selectively channeling, according to the washing cycle manually-selected by the user, a flow of fresh water from the water mains to the detergent dispenser 106 or directly to the washing tub 102.

In addition to the above, the laundry washing machine 100 preferably furthermore comprises an internal water softening device 109 which is located inside the boxlike casing 101, preferably adjacent to the detergent dispenser 106, and is structured for selectively reducing, during each washing cycle, the hardness degree of the tap water that the fresh-water supply circuit 108 channels towards detergent dispenser 106 or washing tub 102.

More in detail, water softening device 109 is preferably fluidically connected to the detergent dispenser 106 so as to be crossed by the fresh water flowing towards washing tub 102 via the detergent dispenser 106, and is preferably internally provided with a given amount of ion-exchange resins or other water softening agent which is capable of restraining the calcium and magnesium ions ($Ca^{++}$ and $Mg^{++}$) dissolved in the water flowing through the same water softening device 109, so as to reduce the hardness degree of the tap water directed towards the washing tub 102.

With reference to FIGS. 1 and 2, in the example shown, in particular, the rotatable drum (not shown) of laundry washing machine 100 is preferably arranged inside the washing tub 102 with the drum rotation axis locally substantially coaxial to the longitudinal axis of washing tub 102, i.e. oriented substantially horizontally, and with the circular front opening or mouth of the drum directly aligned and faced to the circular front opening or mouth of washing tub 102, so as to receive the laundry to be washed through the laundry loading/unloading opening realized on front wall 103.

The washing tub 102, in turn, is preferably suspended in floating manner inside the casing 101 via a suspension system that preferably, though not necessarily, comprises at least one, and preferably a couple of upper coil springs 110 connecting the upper portion of washing tub 102 to the top of casing 101, and preferably at least one, and preferably a couple of vibration dampers 111 connecting the bottom portion of washing tub 102 to the bottom of casing 101. Moreover the laundry washing machine 100 is preferably provided with a substantially cylindrical elastically-deformable bellows (not shown) which watertight connects the front mouth of washing tub 102 to the laundry loading/unloading opening realized on front wall 103 of casing 101.

With reference to FIGS. 1 to 6, the detergent dispenser 106 in turn basically comprises a detergent drawer 115 which is structured for being manually fillable with a given amount of detergent, softener or other washing agent, and is fitted/inserted in manually extractable manner into a corresponding, preferably substantially basin-shaped, drawer housing 116 which is located/recessed inside casing 101 above washing tub 102, and whose entrance is preferably located on front wall 103 of casing 101, above the laundry loading/unloading opening realized on the same front wall 103.

More in detail, the detergent drawer 115 is preferably divided into a number of detergent compartments 117 (three detergent compartments 117 in the example shown) each structured for being manually fillable with a given amount of detergent, softener or other washing agent sufficient to perform only a single washing cycle.

In addition to the above, the laundry washing machine 1 preferably moreover comprises a regeneration-agent drawer 118 which is structured for being manually fillable with a given amount of consumable salt or other regeneration agent to be used in the regeneration process of the water softening agent contained into the water softening device 109, and which is fitted/inserted in manually extractable manner into the drawer housing 116, by the side of detergent drawer 115.

More in detail, in the example shown the regeneration-agent drawer 118 is independently slidingly associated to the drawer housing 116 preferably by means of a telescopic runner 119 attached to a sidewall of drawer housing 116.

Preferably the regeneration-agent drawer 118 is furthermore dimensioned to accommodate an amount of consumable salt or other regeneration agent sufficient for performing a plurality of regeneration processes of the ion-exchange resins or other water softening agent.

With reference to FIGS. 1 to 6, the water supply assembly 1, in turn, is directly connected to the fresh-water supply circuit 108 for receiving the fresh water of the water mains, and is suitably structured for selectively pouring, when both detergent drawer 115 and regeneration-agent drawer 118 are completely fitted/inserted into the drawer housing 116, the fresh water arriving from the water mains into any one of the detergent compartments 117 of detergent drawer 115 or into the regeneration-agent drawer 118.

In case of detergent compartments 117, the poured fresh water serves to selectively flush the contents of the detergent compartment 117 out of the same detergent compartment 117 and down on a first bottom portion 120 of drawer housing 116 which, in turn, communicates with the washing tub 102 so as to allow the mixture of water and detergent, softener or other washing agent to flow into the washing tub 102. In case of regeneration-agent drawer 118, the poured fresh water serves to gradually dissolve the salt contained into the regeneration-agent drawer 118 to form some brine that trickles into a second bottom portion 121 of drawer housing 116, which is fluidly separated from bottom portion 120 and communicates with the water softening device 109, so as to allow the brine (i.e. the mixture of water and salt) to flow into the internal water softening device 109.

In the example shown, in particular, the bottom of drawer housing 116 is preferably divided into two independent and substantially basin-shaped portions 120 and 121 which are arranged side by side to one another, so as to be vertically aligned one to detergent drawer 115 and the other to the regeneration-agent drawer 118.

With reference to FIGS. 2, 3, 4 and 6, the basin-shaped bottom portion 120 collects the mixture of water and detergent, softener or other washing agent coming out from any one of the detergent compartments 117, and preferably communicates with the inside of washing tub 102 via a drain duct 122 that branches off from the bottom of drawer housing 116 and ends into washing tub 102 so as to allow the mixture of water and detergent, softener or other washing agent to flow by gravity directly into washing tub 102. The basin-shaped bottom portion 121, in turn, collects the brine coming out from the regeneration-agent drawer 118, and is in fluid communication with the inside of the water softening device 109 preferably by means of a specific electric pump 152 that can selectively pump the brine (i.e. the mixture of water and salt) into the water softening device 109. Alternatively the brine can freely flow into the water softening device 109 by gravity.

Figure 3:
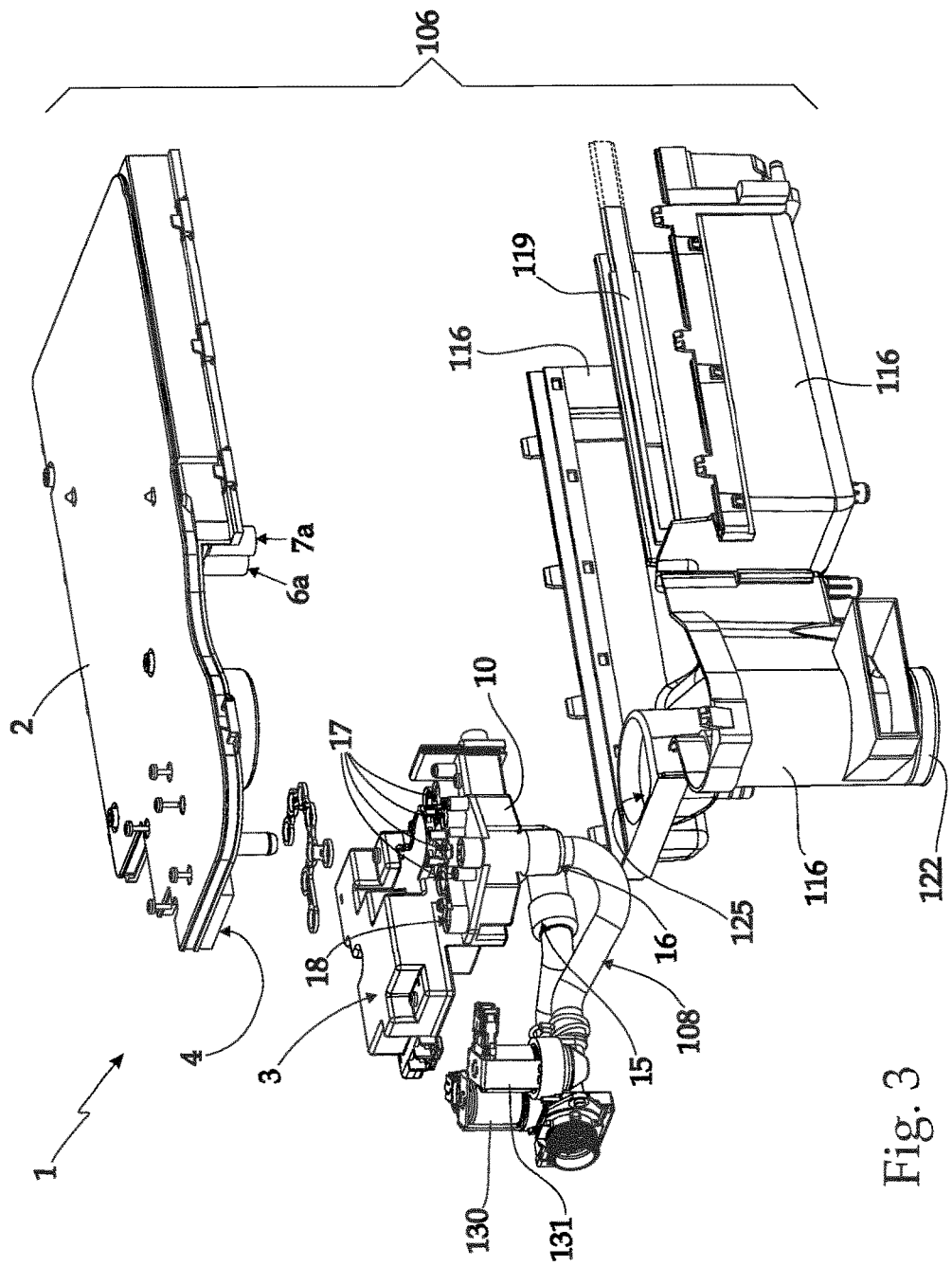
FIG. 3 is a partially exploded perspective view of both the detergent dispenser and the fresh-water supply circuit of the FIG. 1 laundry washing machine, with parts removed for clarity and including the water supply assembly realized in accordance with the teachings of aspects of the present invention.
Figure 4:
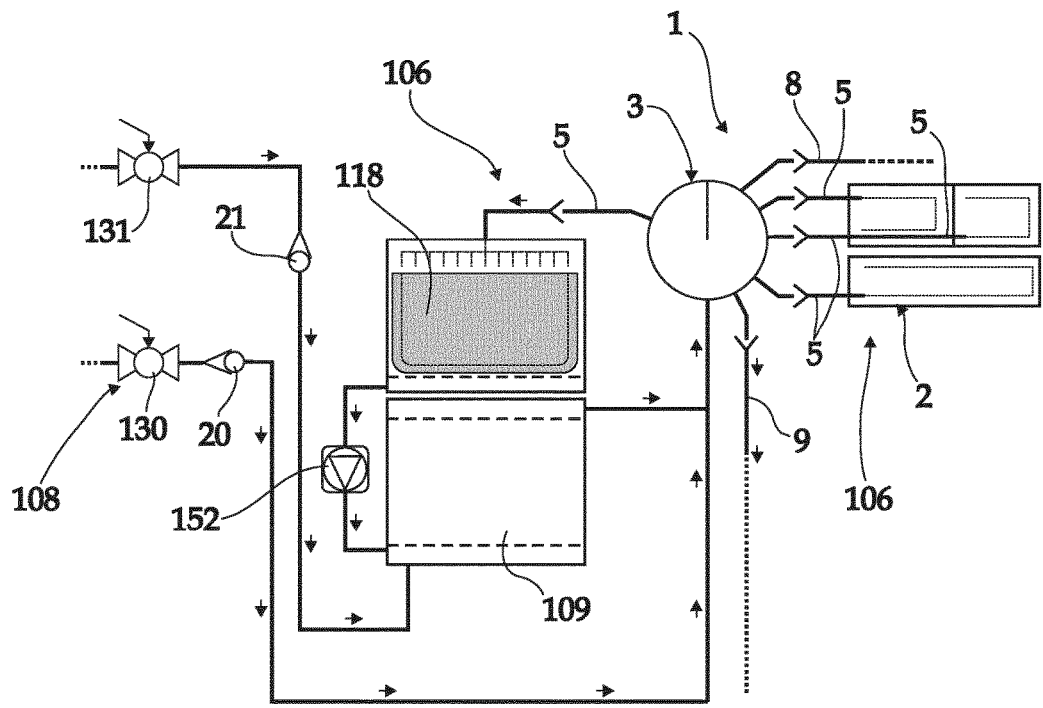
FIG. 4 is a schematic view of the internal hydraulic system of the FIG. 1 laundry washing machine, with parts removed for clarity.
Figure 8:
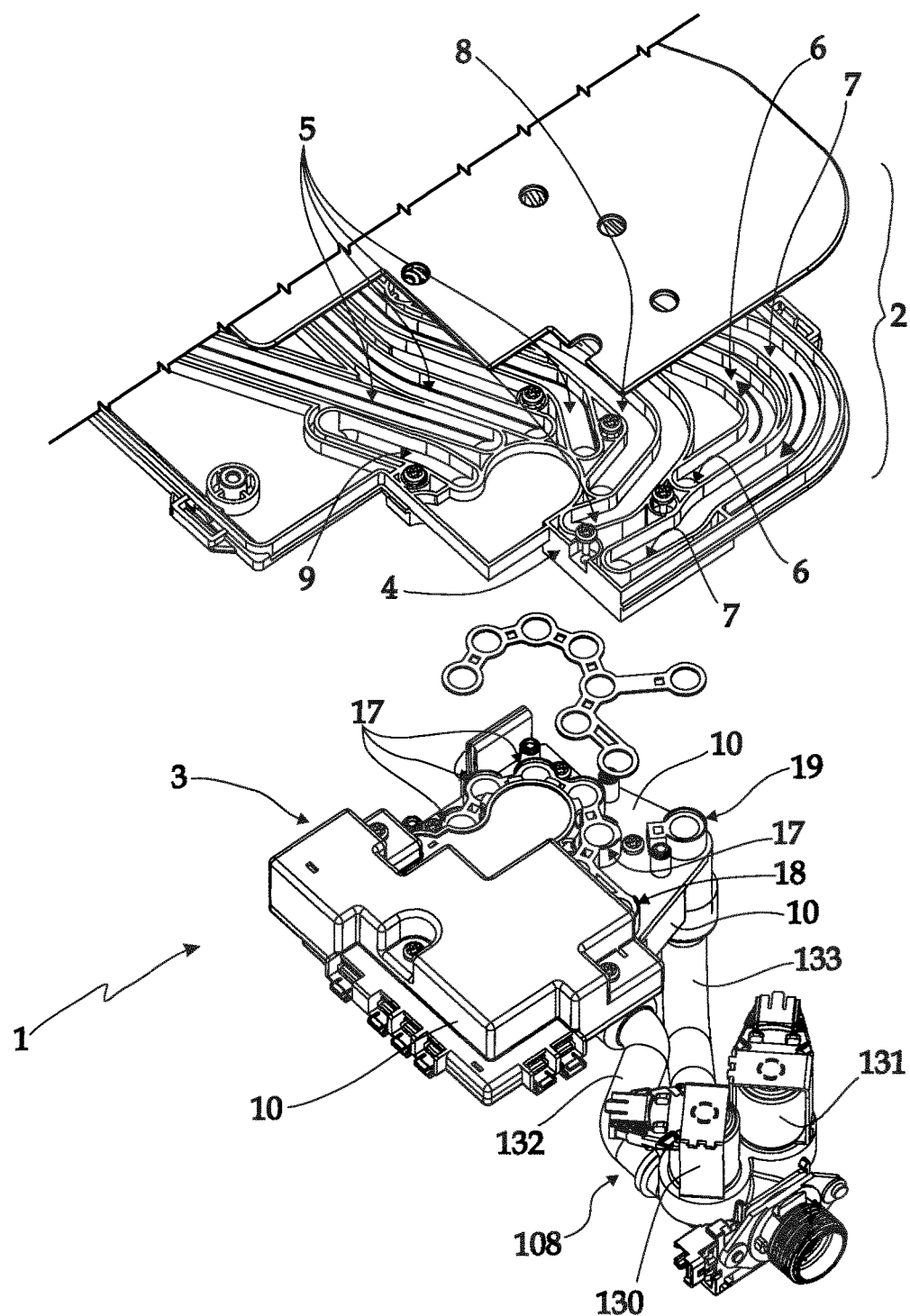
FIG. 8 is a partially exploded perspective view of the FIG. 3 water supply assembly, with parts removed for clarity.

With reference to FIGS. 3, 4, and 8, the water supply assembly 1 is directly connected to the fresh-water supply circuit 108 for receiving the fresh water of the water mains, and basically comprises:

- a preferably plate-like, water delivery member 2 which is suitably structured to form the upper lid of the substantially basin-shaped drawer housing 116 of detergent dispenser 106, so as to be located immediately above the detergent drawer 115 and the regeneration-agent drawer 118 when said drawers are completely inserted/recessed into drawer housing 116; and
- a discrete, electrically-operated, flow-diverter assembly or module 3 which is detachably fixed/attached outside of the plate-like water delivery member 2 at a coupling socket 4 preferably realized on one of the two major faces of the plate-like water delivery member 2.

With reference to FIGS. 3, 5, 7 and 8, the plate-like water delivery member 2 is provided, at coupling socket 4, with a number of water inlets each separately communicating with a corresponding water-delivery portion of plate-like water delivery member 2 that is suitably structured to allow the outflow of the water from the plate-like water delivery member 2. Some of these water-delivery portions are preferably arranged on the plate-like water delivery member 2 so as to channel the water into the detergent drawer 115, and at least one of these water-delivery portions is preferably arranged on the plate-like water delivery member 2 so as to channel the water into the regeneration-agent drawer 118.

The flow-diverter module 3, in turn, is directly connectable to the fresh-water supply circuit 108 for receiving the fresh water of the water mains, and is structured so to separately communicate, at coupling socket 4, with each water inlet of the plate-like water delivery member 2. The flow-diverter module 3 furthermore internally accommodates a rotatable flow diverter which is capable of selectively channeling the water entering into the flow-diverter module 3 towards/into any one of the water inlets of the plate-like water delivery member 2 located at coupling socket 4.

More in detail, with reference to FIGS. 3, 4, 5, 7 and 8, the plate-like water delivery member 2 is provided with a number of internal water channels 5 each of which separately begins at coupling socket 4 of plate-like water delivery member 2, and extends inside the body of plate-like water delivery member 2 up to reach a corresponding water-delivery portion 5a of the plate-like water delivery member 2. The water-delivery portion 5a, in turn, is suitably structured to allow the water arriving from the internal water channel 5 to come out of the plate-like water delivery member 2.

The flow-diverter module 3, in turn, is structured so to separately communicate, at coupling socket 4, with the mouth of the various internal water channels 5 of the plate-like water delivery member 2, and is internally provided with a rotatable flow diverter which is capable of selectively channeling the water entering into the flow-diverter module 3 towards/into any one of the mouths of the internal water channels 5 located at coupling socket 4.

In other words, the plate-like water delivery member 2 is provided with a number of water-delivery portions 5a each of which directly communicates with a respective internal water channel 5 that begins at coupling socket 4, and is suitably structured to pour, when both detergent drawer 115 and regeneration-agent drawer 118 are completely inserted/recessed into drawer housing 116, the fresh water flowing along the corresponding internal water channel 5 either into a respective detergent compartment 117 of detergent drawer 115 or into the regeneration-agent drawer 118.

Figure 7:
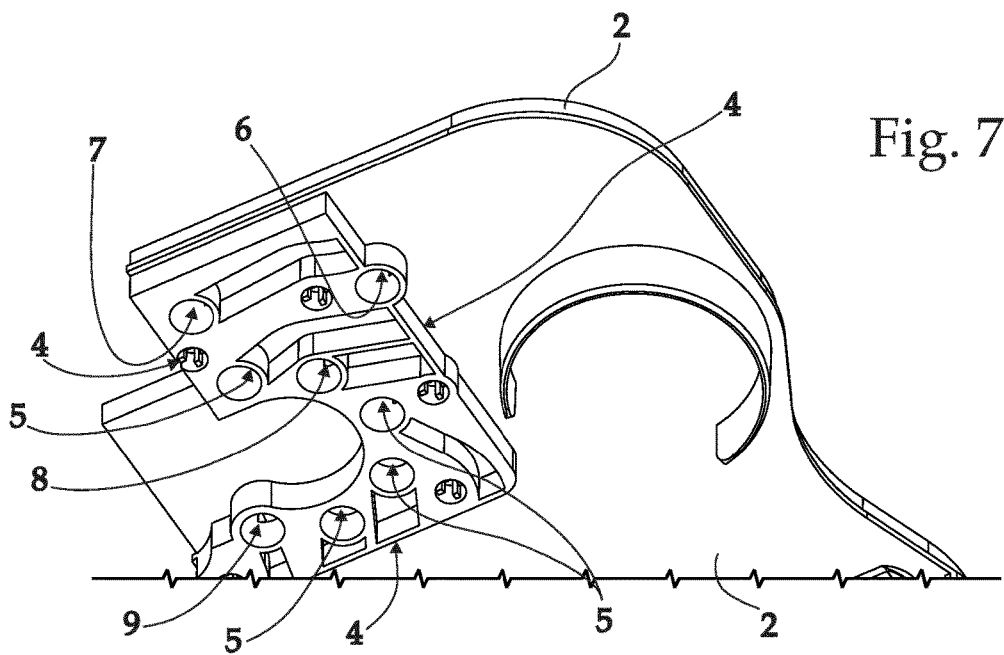
FIG. 7 is a perspective view of a portion of the FIG. 5 plate-like water delivery member.

With reference to FIGS. 3, 7 and 8, in particular, the coupling socket 4 of plate-like water delivery member 2 is preferably located on a protruding portion of plate-like water delivery member 2 that cantilevered juts out from the perimeter of drawer housing 116, at the top of drawer housing 116. The coupling socket 4 is preferably also realized on the lower face of the plate-like water delivery member 2, i.e. on the face of the plate-like water delivery member 2 directly faced to the drawer housing 116, so that the flow-diverter module 3, when coupled to the socket 4 of plate-like water delivery member 2, is arranged by the side of drawer housing 116.

Furthermore, in the example shown each water-delivery portion 5a of plate-like water delivery member 2 is preferably realized on the lower face of plate-like water delivery member 2 so as to be locally substantially vertically aligned to a corresponding detergent compartment 117 of the detergent drawer 115 or to the regeneration-agent drawer 118.

Moreover each water-delivery portion 5a of plate-like water delivery member 2 is preferably suitably structured to pour by gravity a shower of water droplets into the detergent compartment 117 of detergent drawer 115 or into the regeneration-agent drawer 118 located immediately beneath.

With reference to Figures from 3 to 8, the plate-like water delivery member 2 is preferably additionally provided with a supplementary water inlet and a supplementary water outlet, which are located at coupling socket 4 and separately communicate respectively with the water inlet 123 and with the water outlet 124 of the internal water softening device 109. Thus the fresh water entering into the plate-like water delivery member 2 through the supplementary water inlet is allowed to return back to coupling socket 4 after having crossed the water softening device 109 wherein the hardness degree of the water is reduced.

In the example shown, in particular, the plate-like water delivery member 2 is preferably provided with two further internal water channels 6 and 7 that separately begin at coupling socket 4 of plate-like water delivery member 2, and separately communicate respectively with the water inlet 123 and with the water outlet 124 of the internal water softening device 109. Thus the fresh water entering into the plate-like water delivery member 2 at coupling socket 4 is allowed to flow along the internal water channel 6 of plate-like water delivery member 2 towards the water inlet 123 of water softening device 109, and then to return back to coupling socket 4 along the internal water channel 7 after having crossed the water softening device 109 wherein the hardness degree of the water is reduced.

More in detail, the internal water channels 6 and 7 extend inside the body of plate-like water delivery member 2 preferably up to reach a couple of corresponding hydraulic connectors 6a and 7a which are preferably located on the plate-like water delivery member 2 spaced apart from coupling socket 4, and are structured to separately watertight couple, respectively, with the water inlet 123 and with the water outlet 124 of water softening device 109, so as to put the plate-like water delivery member 2 in fluid communication with the water softening device 109.

In the example shown, in particular, each hydraulic connector 6a, 7a preferably protrudes downwards from the lower face of plate-like water delivery member 2, and is preferably structured to watertight couple in a stable, though easy detachable manner with a corresponding hydraulic connector 123, 124 of the water softening device 109 forming the water inlet or the water outlet of the same water softening device 109.

With reference to Figures from 4 to 8, preferably the plate-like water delivery member 2 is moreover provided with a further internal water channel 8 that begins at coupling socket 4 alike the other internal water channels 5, 6 and 7, and extends inside the body of plate-like water delivery member 2 up to reach a corresponding further water-delivery portion 8a of plate-like water delivery member 2, which is preferably suitably located and structured to pour the water arriving from water channel 8 directly into the basin-shaped bottom portion 120 of drawer housing 116 bypassing detergent drawer 115, or directly into the drain duct 122 that branches off from the bottom of drawer housing 116; and the flow-diverter module 3 is suitably structured to selectively channel the water entering into the same flow-diverter module 3 also towards/into the mouth of said further internal water channel 8.

Lastly, with reference to Figures from 4 to 8, the plate-like water delivery member 2 is preferably also provided with a still further internal water channel 9 that begins at coupling socket 4 alike the other internal water channels 5, 6, 7 and 8, and extends inside the body of the plate-like water delivery member 2 up to reach a corresponding further water-delivery portion 9a of plate-like water delivery member 2 which, in turn, communicates with a water drain pipeline (not shown) of laundry washing machine 100; and the flow-diverter module 3 is suitably structured to selectively channel the water entering into the same flow-diverter module 3 also towards/into the mouth of said further internal water channel 9.

With reference to Figures from 4 to 8, in the example shown, in particular, the internal water channel 9 of plate-like water delivery member 2 preferably extends inside the body of plate-like water delivery member 2 up to reach the water-delivery portion 9a which is suitably located and structured to pour the water arriving from water channel 9 directly into a specific funnel-shaped portion 125 of drawer housing 116. This funnel-shaped portion is distinct and separated from the compartments of drawer housing 116 accommodating, respectively, the detergent drawer 115 and the regeneration-agent drawer 118, and communicates with the water drain pipeline (not shown) of laundry washing machine 100.

Figure 5:
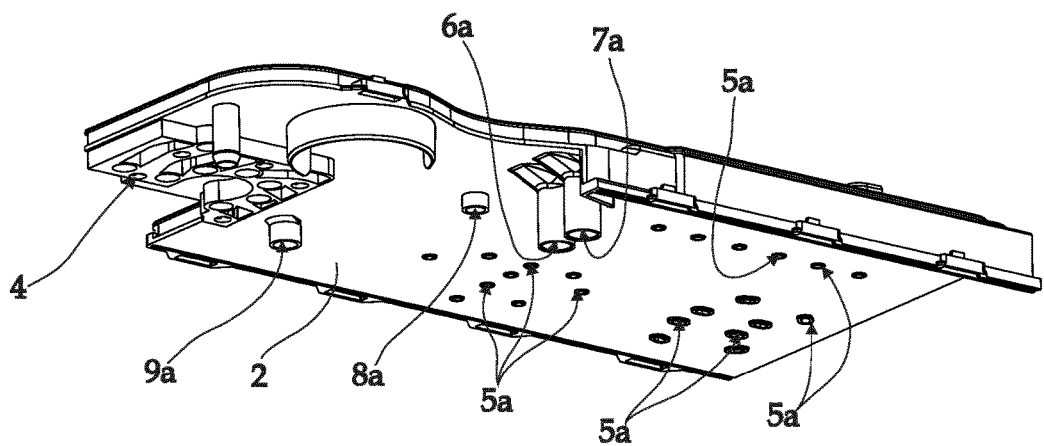
FIG. 5 is a perspective view of the plate-like water delivery member of the FIG. 4 water supply assembly.
Figure 6:
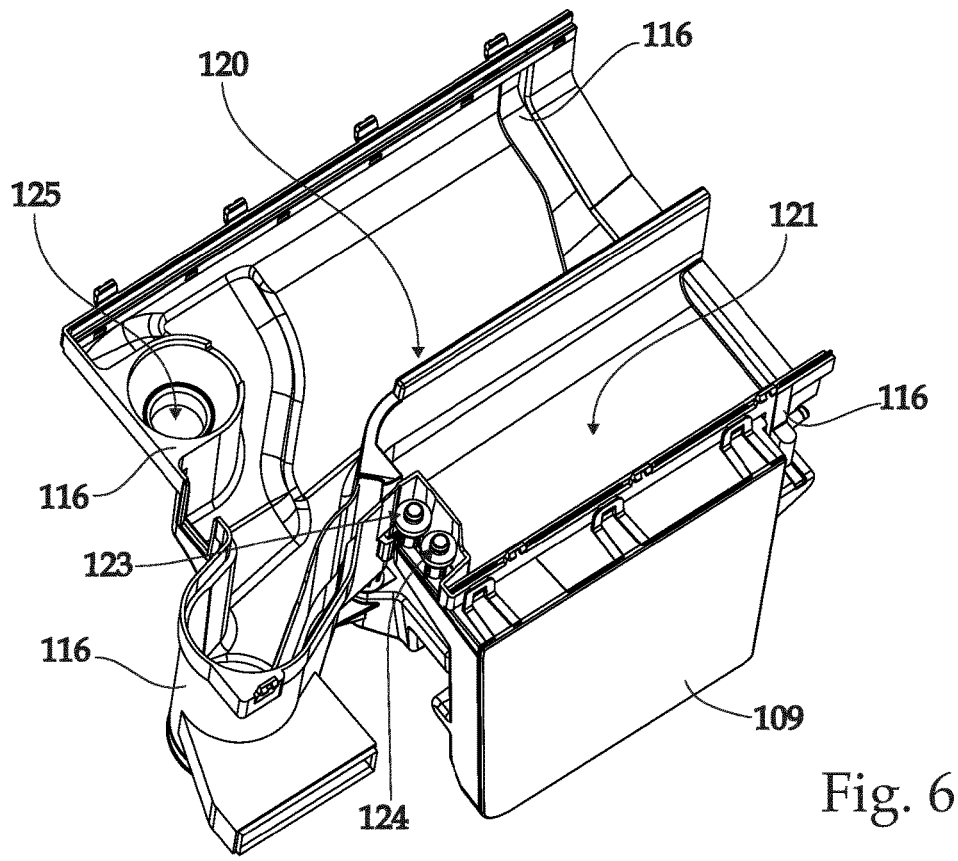
FIG. 6 is a perspective view of the drawer housing of the FIG. 3 detergent dispenser, with parts removed for clarity.

More in detail, with reference to FIGS. 5 and 6, the internal water channel 9 preferably communicates with a water-delivery portion 9a of plate-like water delivery member 2 which is faced to the inside of drawer housing 116, and is substantially vertically aligned to the centre of the funnel-shaped portion 125 of drawer housing 116, so that the funnel-shaped portion 125 of drawer housing 116 forms an air break device which is integral to drawer housing 116 of detergent dispenser 106 and prevents the backflow of the water towards the plate-like water delivery member 2.

The water drain pipeline (not shown) of laundry washing machine 100, in turn, ends directly on the bottom of washing tub 102, or into the drain sump 126 that extends downwards form the bottom of the washing tub 102, or into the water filtering assembly (not shown) that is interposed between the drain sump 126 of washing tub 102 and the suction of either the water circulating pump (not shown) or the water exhaust pump (not shown) of the laundry washing machine 100, or substantially directly into the water exhaust pump (not shown) that pumps the waste water or washing liquor outside of laundry washing machine 100, or in any case into the waste-water drain line (not shown) that channels the waste water or washing liquor outside of the laundry washing machine 100.

With reference to FIGS. 8 to 15, the flow-diverter module 3, in turn, basically comprises:

- an outer casing 10 which is discrete/separated from the plate-like water delivery member 2, is connectable to the fresh-water supply circuit 108 for receiving the fresh water of the water mains, and has an interface portion suitably structured to watertight couple in detachable manner with coupling socket 4 of plate-like water delivery member 2 for separately communicating, at coupling socket 4, with the various water inlets of the plate-like water delivery member 2, i.e. with the various internal water channels 5, 6, 7, 8 and 9 of the plate-like water delivery member 2;
- a rotatable flow diverter 11 which is fitted/recessed in axially rotatable manner into a hollow seat 12 realized inside the outer casing 10;
- an electrically-operated motor assembly 13 which is preferably housed inside the outer casing 10 or at least associated to the outer casing 10, and is mechanically connected to the rotatable flow diverter 11 for controlling the angular position of the flow diverter 11 inside the hollow seat 12 of outer casing 10; and preferably also
- an electronic control unit 14 which is housed inside the outer casing 10, and is structured to directly power and control the electrically-operated motor assembly 13 according to electric signals arriving from the main electronic central control unit (not shown) of laundry washing machine 100.

More in detail, the outer casing 10 is provided with a first and preferably a second main water inlets 15 and 16, which are preferably located substantially opposite to the interface portion of outer casing 10, and are each structured to independently watertight couple/connect with the fresh-water supply circuit 108 for separately receiving the fresh water of the water mains; and with a number of main water outlets 17 which are located at the interface portion of outer casing 10, preferably one beside the other, and are each structured to watertight couple/connect, at coupling socket 4, with a respective water inlet of the plate-like water delivery member 2, i.e. with the mouth of a respective internal water channel 5, 8 and 9 of the plate-like water delivery member 2, preferably with the interposition of a corresponding annular sealing gasket.

With reference to Figures from 3 to 11, in the example shown, in particular, the fresh-water supply circuit 108 of laundry washing machine 100 preferably comprises two independent electrically-operated on-off valves 130 and 131 each separately connectable to the water mains; and the main water inlets 15 and 16 of flow-diverter module 3 are preferably separately connected each to a respective on-off valve 130, 131 of the fresh-water supply circuit 108 via a corresponding connecting hosepipe or manifold 132, 133.

Water inlet 15 of flow-diverter module 3 directly communicates with the hollow seat 12 of outer casing 10 via a first internal connecting channel which is structured to directly channel the fresh water of fresh-water supply circuit 108 towards the water inlet of the rotatable flow diverter 11. The water outlets 17 of flow-diverter module 3, in turn, separately directly communicate with the hollow seat 12 of outer casing 10 each via respective second internal connecting channel; and the rotatable flow diverter 11 is capable of selectively channeling, according to its angular position inside the hollow seat 12, the fresh water entering into its water inlet towards any one of the water outlets 17.

Furthermore, with particular reference to FIGS. 3, 8, 9, 10 and 11, the outer casing 10 of flow-diverter module 3 is additionally provided with an auxiliary water inlet 18 and preferably also an auxiliary water outlet 19 which are preferably located at the interface portion of outer casing 10, next to main water outlets 17, and are structured to watertight couple/connect, at coupling socket 4, each with the mouth of a respective internal water channel 6 and 7 of the plate-like water delivery member 2, preferably with the interposition of a corresponding annular sealing gasket.

More in detail, the auxiliary water inlet 18 is preferably located beside the main water outlets 17, and is structured to watertight couple/connect, at coupling socket 4, with the mouth of the internal water channel 7 of plate-like water delivery member 2, i.e. the internal water channel 7 that communicates with the hydraulic connector 7a structured to watertight couple with the water outlet 124 of the internal water softening device 109 of laundry washing machine 100. The auxiliary water inlet 18 furthermore directly communicates with the hollow seat 12 of outer casing 10 via a third internal connecting channel that ends roughly immediately upstream of the water inlet of the rotatable flow diverter 11, so as to channel the water entering into the same auxiliary water inlet 18 towards the water inlet of the rotatable flow diverter 11.

In other words, the auxiliary water inlet 18 of flow-diverter module 3 allows the softened fresh water flowing back from water softening device 109 along internal water channel 7 to return again into the flow diverter module 3 and reach the water inlet of the rotatable flow diverter 11.

The auxiliary water outlet 19, in turn, is preferably located beside the main water outlets 17 likewise auxiliary water inlet 18, and is structured to watertight couple/connect, at coupling socket 4, with the mouth of the internal water channel 6 of plate-like water delivery member 2, i.e. the internal water channel 6 that communicates with the hydraulic connector 6a structured to watertight couple with the water inlet 123 of the internal water softening device 109 of laundry washing machine 100.

The auxiliary water outlet 19 of flow-diverter module 3 furthermore directly communicates with the water inlet 16 of the same flow-diverter module 3 via a fourth internal connecting channel which is structured to bypass the hollow seat 12 of outer casing 10 and the rotatable flow diverter 11 located therein, so as to channel the fresh water of the fresh-water supply circuit 108 directly to the plate-like water delivery member 2.

Figure 10:
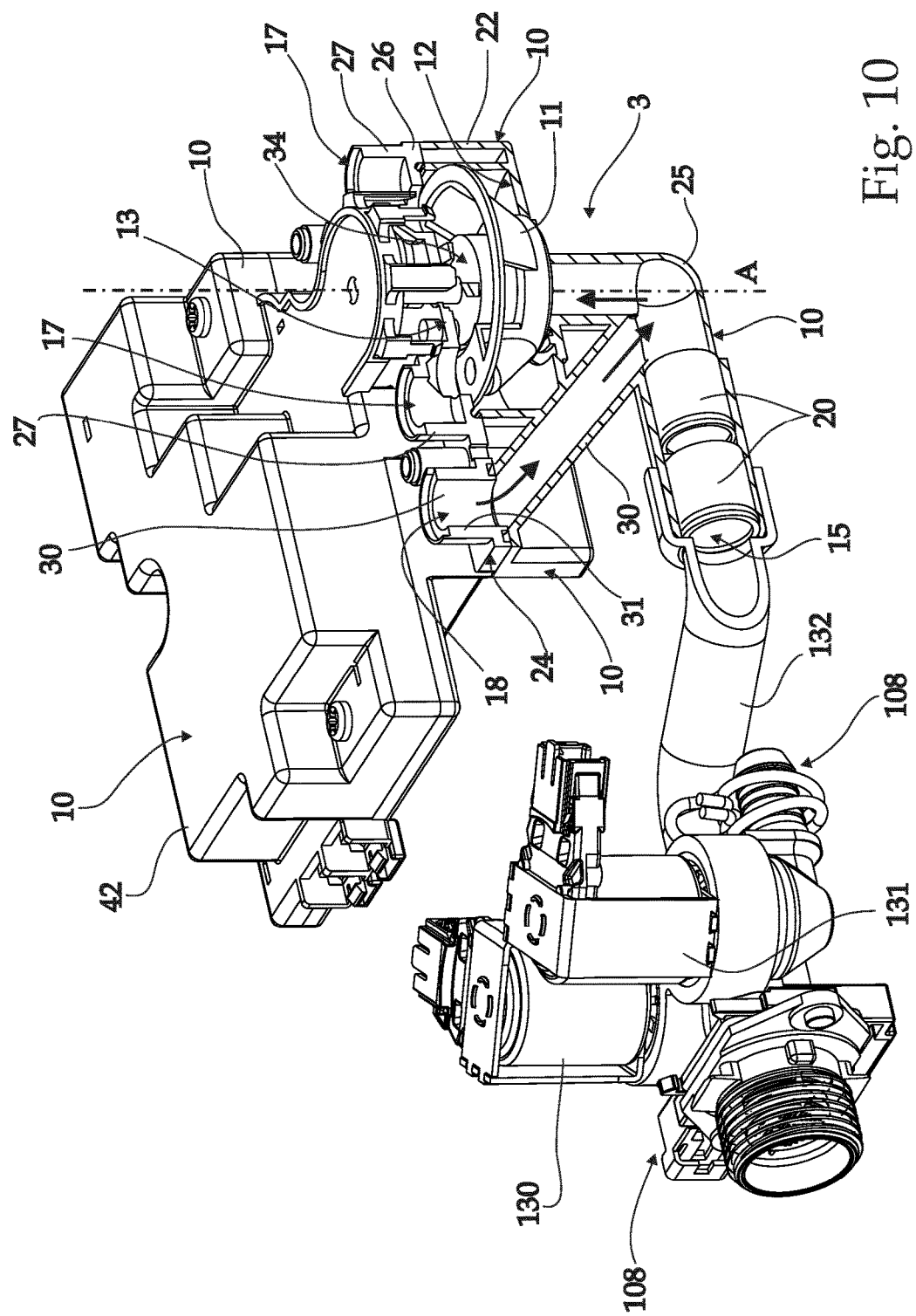
FIGS. 10 and 11 are two perspective views of the FIG. 9 flow diverter assembly with parts in section and parts removed for clarity.
Figure 11:
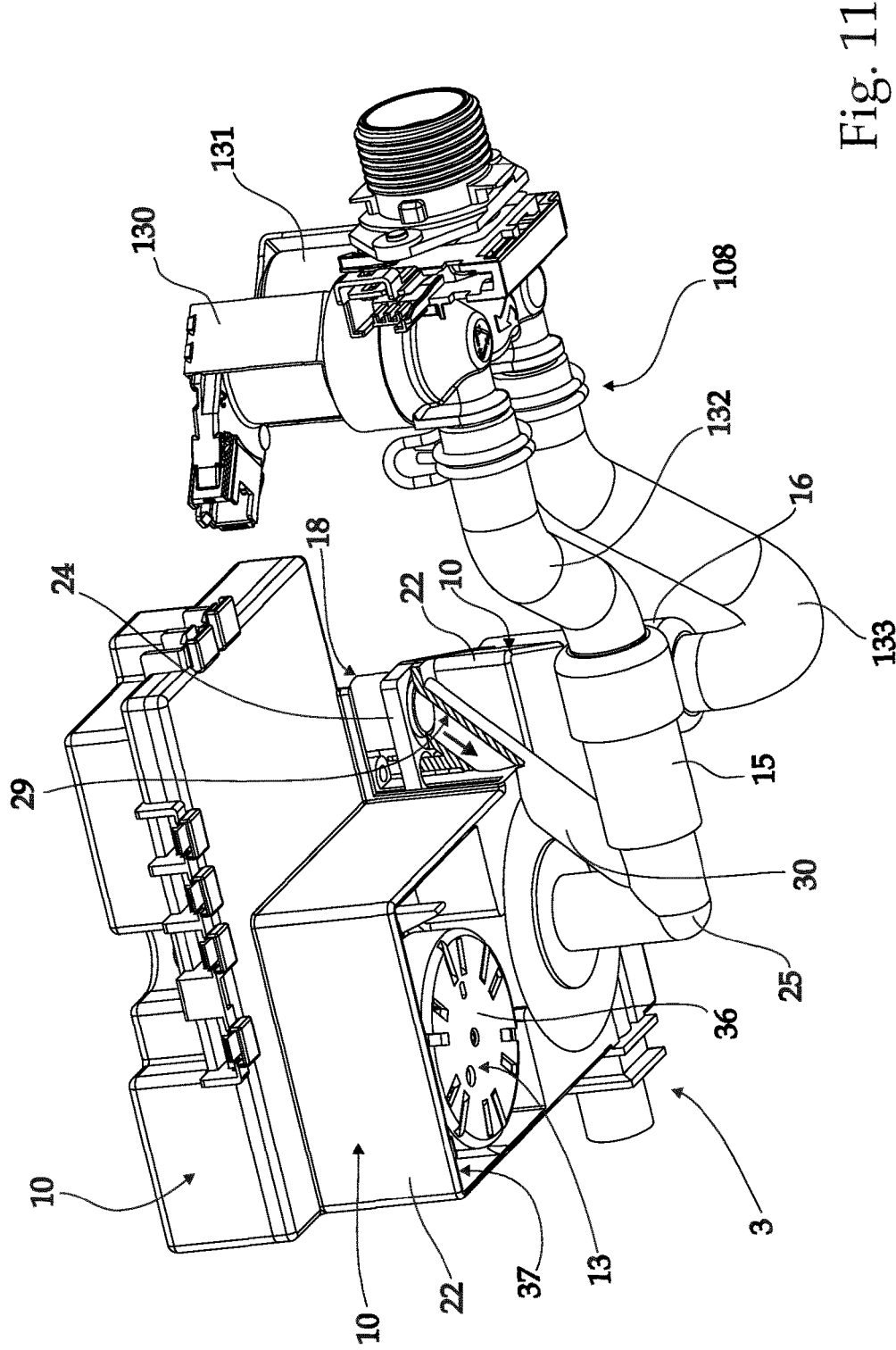

With reference to FIGS. 10 and 11, the flow-diverter module 3 preferably furthermore comprises one or more one-way valves for preventing the backflow of fresh water towards the fresh-water supply circuit 108.

More in detail, in the example shown the flow-diverter module 3 preferably comprises at least one, and preferably two, one-way valves 20 which are preferably located inside the outer casing 10, one after the other immediately downstream of water inlet 15, i.e. along the internal connecting channel that puts water inlet 15 in direct communication with the hollow seat 12 of outer casing 10, and are oriented so as to prevent backflow of fresh water towards the fresh-water supply circuit 108. Moreover the flow-diverter module 3 preferably comprises at least one, and preferably two, one-way valves 21 which are preferably located inside the outer casing 10, one after the other downstream of water inlet 16, i.e. along the internal connecting channel that puts water inlet 16 in direct communication with the auxiliary water outlet 19 of outer casing 10, and are oriented so as to prevent backflow of fresh water towards the fresh-water supply circuit 108.

With reference to Figures from 9 to 15, in the example shown, in particular, the outer casing 10 of flow-diverter module 3 preferably comprises: a substantially plate-like main body 22 having, on a substantially flat portion of its upper face, a preferably substantially cylindrical, sink-shaped main cavity which is suitably shaped/structured to accommodate the rotatable flow diverter 11; and a plate-like upper lid 24 which is fixed/attached to the flat portion of the upper face of main body 22 so as to close in watertight manner the sink-shaped cavity and complete the hollow seat 12.

The bottom of the sink-shaped cavity of plate-like main body 22 additionally has, preferably roughly at centre, a water-inlet opening which communicates with a preferably substantially L-bent, tubular pipe 25 that cantilevered protrudes from the lower face of main body 22, and is structured to watertight couple with the fresh-water supply circuit 108 of the laundry washing machine 100 for receiving the water of the water mains.

The rotatable flow diverter 11 is fitted/recessed inside the sink-shaped cavity of the main body 22 with the water inlet arranged immediately above the water-inlet opening so as to collect the water entering into the hollow seat 12, and with the capability of freely rotating about a reference axis A which is locally substantially perpendicular to both the bottom of the sink-shaped cavity and to the plate-like upper lid 24.

The distal end of tubular pipe 25 forms the water inlet 15 of outer casing 10, and the end portion of tubular pipe 25 is preferably dimensioned to accommodate the two one-way valves 20 one after the other.

Figure 13:
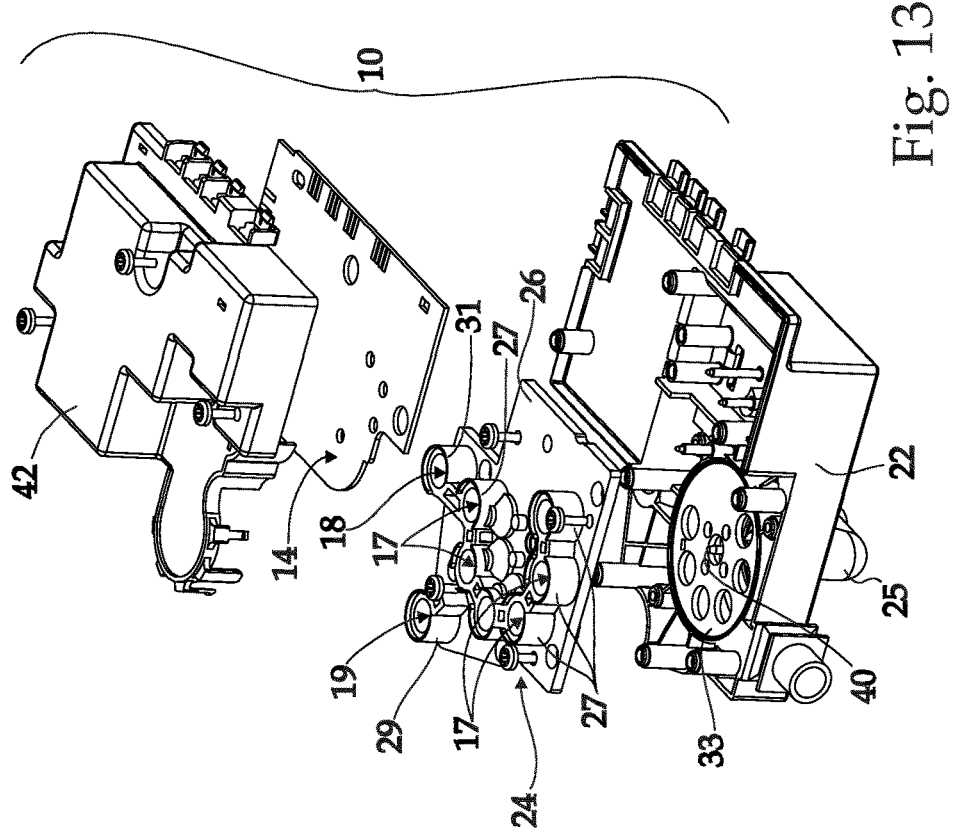
FIGS. 12 and 13 are two partially exploded perspective views of the FIG. 9 flow diverter assembly with parts removed for clarity.
Figure 12:
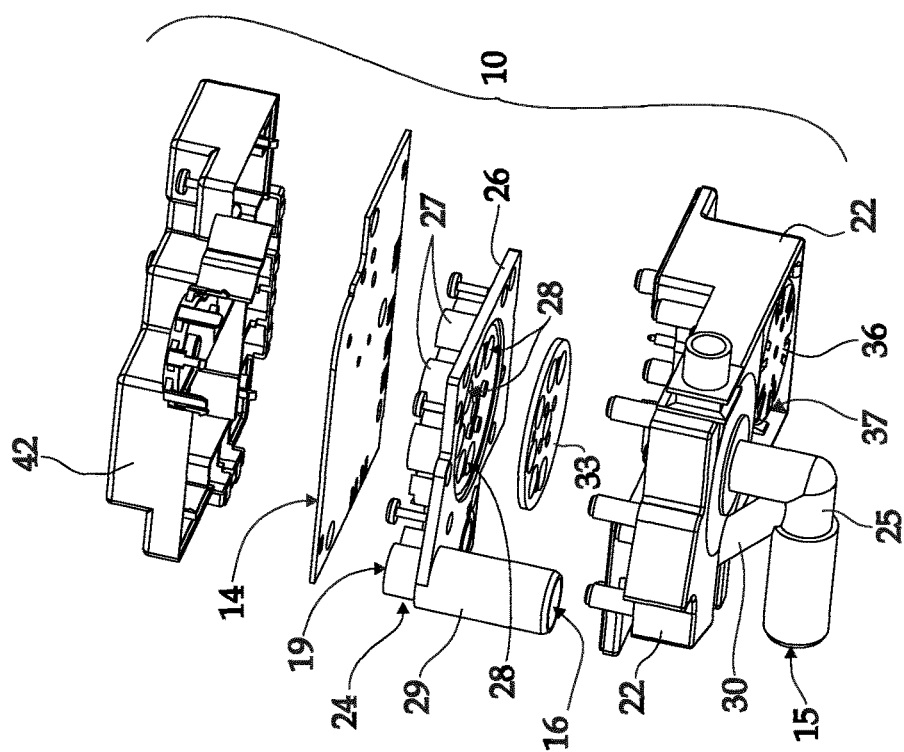

With particular reference to FIGS. 12 and 13, the plate-like upper lid 24, in turn, forms the interface portion of the outer casing 10, and preferably comprises a plate portion 26 which is structured to cover and watertight close the flat portion of the upper face of main body 22 where the sink-shaped cavity is located, and is furthermore preferably provided with a number of transversal tubular sleeves 27 which protrude upwards from the upper face of the plate portion 26 preferably while remaining substantially perpendicular to the laying plane of the same plate portion 26. Each tubular sleeves 27 directly communicates with the other side of the plate portion 26 via a respective through opening 28 which is arranged on plate portion 26 so to be directly faced to the inside of the sink-shaped cavity of main body 22. These through openings 28 are furthermore realized on the lower face of the plate portion 26 angularly spaced about reference axis A, along a circular path locally substantially coaxial to reference axis A.

The tubular sleeves 27 are suitably shaped/dimensioned to fit, when the flow-diverter assembly is attached to socket 4 of plate-like water delivery member 2, each in watertight manner into the mouth of a corresponding internal water channel 5, 8 or 9 of plate-like water delivery member 2, preferably with the interposition of a corresponding annular sealing gasket, and therefore form the water outlets 17 of outer casing 10.

Figure 9:
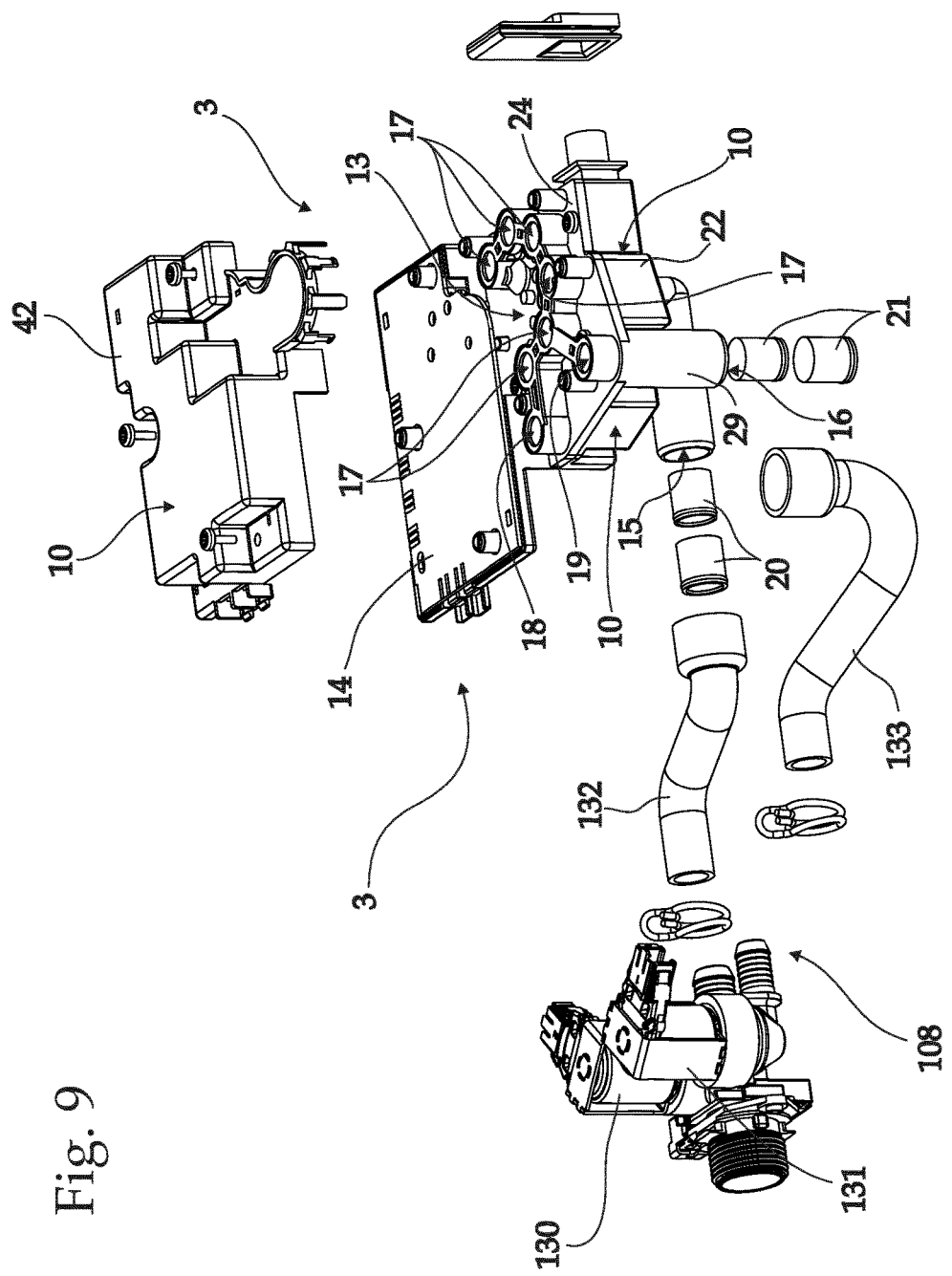
FIG. 9 is a partially exploded perspective view of the flow diverter assembly of the FIG. 3 water supply assembly, together with other components of the laundry washing machine.

With particular reference to FIGS. 9, 12 and 13, the plate-like upper lid 24 furthermore comprises a tubular-shaped portion 29 which is preferably substantially perpendicular to the laying plane of plate portion 26, extends in pass-through manner through plate portion 26, and is preferably realized in one piece with the same plate portion 26.

The axial end of tubular-shaped portion 29 protruding from plate portion 26 beside the tubular sleeves 27, is suitably shaped/dimensioned to fit, when the flow-diverter assembly is attached to socket 4 of plate-like water delivery member 2, in watertight manner into the mouth of the internal water channel 6 of plate-like water delivery member 2, preferably with the interposition of an annular sealing gasket, and forms the auxiliary water outlet 19 of outer casing 10.

The axial end of tubular-shaped portion 29 protruding from plate portion 26 beside the plate-like main body 22, on the other hand, is structured to watertight couple with the fresh-water supply circuit 108 of the laundry washing machine 100 for receiving the water of the water mains, and therefore forms the water inlet 16 of outer casing 10.

Likewise tubular pipe 25, the lower segment of tubular-shaped portion 29 is preferably suitably dimensioned to accommodate the two one-way valves 21 one after the other.

With reference to FIGS. 10, 11 and 12, the plate-like main body 22 is finally provided with a second tubular pipe 30 that branches off from the flat portion of the upper face of main body 22 beside the sink-shaped cavity of main body 22, and joints the beneath-located tubular pipe 25, preferably downstream of the one-way valves 20 and preferably roughly at bend of tubular pipe 25.

Figure 14:
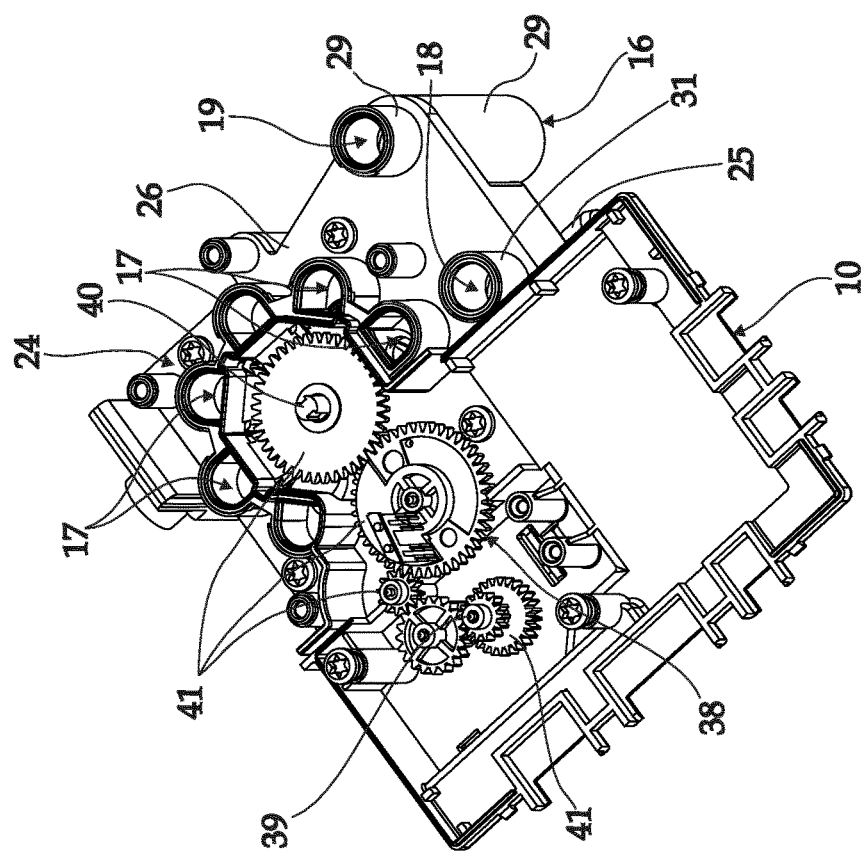
FIG. 14 is a perspective view of part of the FIG. 9 flow diverter assembly with parts removed for clarity.

With reference to FIGS. 10, 13 and 14, the plate-like upper lid 24, in turn, is provided with a further tubular sleeve 31 that protrudes from the upper face of plate portion 26 substantially perpendicular to the laying plane of plate portion 26, beside the tubular sleeves 27, is vertically aligned to the upper mouth of tubular pipe 30 so as to directly communicate with the latter, and is suitably shaped/dimensioned to fit, when the flow-diverter assembly is attached to socket 4 of plate-like water delivery member 2, in watertight manner into the mouth of the internal water channel 7 of plate-like water delivery member 2, preferably with the interposition of an annular sealing gasket, and therefore forms the auxiliary water inlet 18 of outer casing 10.

Figure 15:
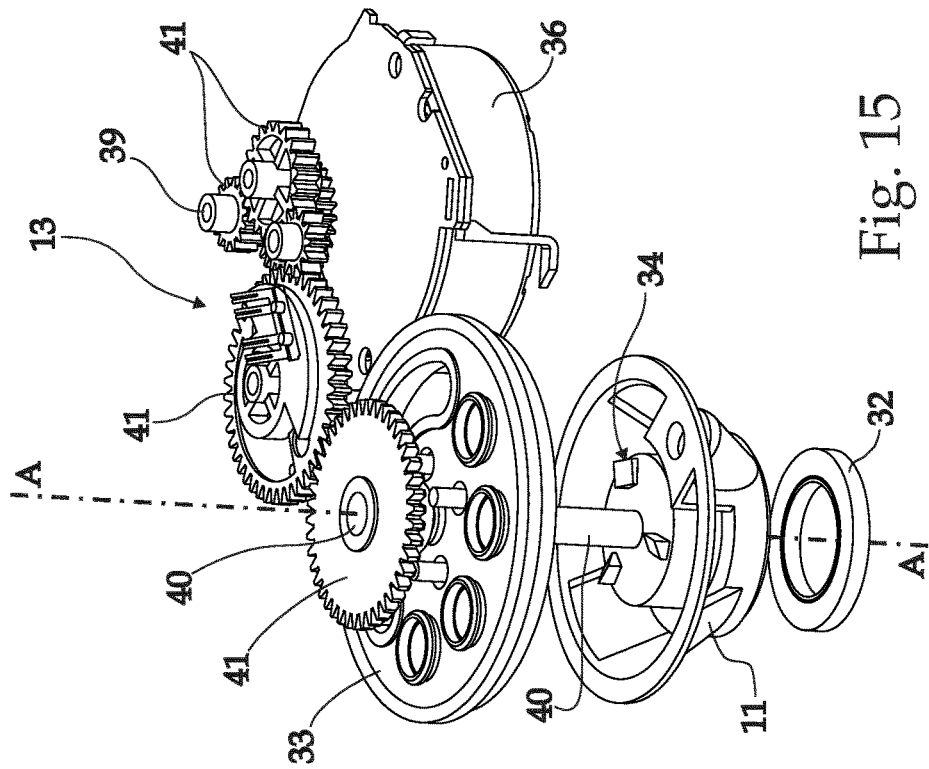
FIG. 15 is a perspective view of some inner components of the FIG. 9 flow diverter assembly.

With reference to FIGS. 10 and 14 to 15, the rotatable flow diverter 11 in turn preferably consists in a substantially frustoconical or cylindrical, funnel-shaped nozzle member 11 which is substantially coaxial to reference axis A and is fitted in axially rotatable manner inside the sink-shaped cavity of main body 22, i.e. inside the hollow seat 12 of outer casing 10, immediately above the water-inlet opening on the bottom of the sink-shaped cavity of main body 22, so as to completely cover said water-inlet opening. The nozzle member 11 is provided with a substantially circular-shaped, water-inlet mouth which is arranged substantially coaxial to reference axis A immediately above the water-inlet opening realized on the bottom of the sink-shaped cavity of main body 22, and is substantially watertight coupled to the bottom of the sink-shaped cavity of main body 22, so as to be able to collect all water coming out from the water-inlet opening present on the bottom of the sink-shaped cavity; and a preferably substantially circular-shaped, eccentric water-outlet mouth which is misaligned to reference axis A and directly faces the inner face of plate portion 26 where the through openings 28 are located.

When the nozzle member 11 rotates about axis A, the water-inlet mouth of nozzle member 11 remains aligned to the water-inlet opening present on the bottom of the sink-shaped cavity of main body 22, whereas the water-outlet mouth of the nozzle member 11 moves tangent to the lower face of the plate portion 26 on a circular path locally coaxial to reference axis A so as to selectively align and substantially watertight couple, according to its angular position inside the hollow seat 12, with any one of through openings 28 of the plate portion 26.

With reference to FIG. 12e 15, in the example shown, in particular, the flow-diverter assembly preferably comprises an annular sealing gasket 32 which is interposed between the bottom of the sink-shaped cavity of main body 22 and the circular rim of the water-inlet mouth of nozzle member 11, and is structured so as to substantially watertight coupled the nozzle member 11 to the bottom of the sink-shaped cavity, allowing at same time free axial rotation of the water-inlet mouth of nozzle member 11 on the bottom of the sink-shaped cavity about axis A. Preferably the annular sealing gasket 32 is furthermore structured so as to also allow free axial displacement of the water-inlet mouth of nozzle member 11 parallel to axis A to and from the bottom of the sink-shaped cavity.

Furthermore the flow-diverter module 3 preferably also comprises a discoid sealing gasket 33 which is interposed between the upper end of nozzle member 11 and the plate portion 26 of the plate-like upper lid 24 where the through openings 28 are located, and is provided with a number of pass-through holes each aligned to a respective through opening 28. Likewise annular sealing gasket 32, the discoid sealing gasket 33 is structured so as to substantially watertight coupled the eccentric water-outlet mouth of nozzle member 11 to any one of the through openings 28 realized on the plate portion 26, allowing free gliding movement of the eccentric water-outlet mouth of nozzle member 11 from one through opening 28 to another, and preferably also free axial displacement of the eccentric water-outlet mouth of nozzle member 11 parallel to axis A.

With reference to FIGS. 10 and 15, preferably the flow-diverter module 3 is additionally provided with a cam device 34 which is preferably interposed between the plate-like upper lid 24 and the upper end of nozzle member 11, and is suitably structured to temporarily move, parallel to axis A and during each angular displacement of the nozzle member 11 for moving the eccentric water-outlet mouth of nozzle member 11 from one through opening 28 to another, the eccentric water-outlet mouth of nozzle member 11 away from the discoid sealing gasket 33 for preventing an excessive wearing of the surface of discoid sealing gasket 33.

With reference to FIGS. 11 to 15, the electrically-operated motor assembly 13, in turn, preferably comprises an electric motor 36 or similar electrically-operated driving device which is preferably oriented parallel to the rotation axis A of the rotatable flow diverter 11, and is fitted/recessed into a corresponding second hollow seat 37 realized in the outer casing 10, preferably spaced apart beside the hollow seat 12; and a drive system 38 which is structured to mechanically connect the driving shaft 39 of electric motor 36 to the pivot shaft 40 of rotatable flow diverter 11 for allowing the electric motor 36 to vary/control the angular position of the rotatable flow diverter 11 inside the hollow seat 12. The drive system 38 is located into a corresponding compartment of the outer casing 10 preferably located adjacent to both hollow seat 12 and to hollow seat 37.

More in detail, in the example shown, the electric motor 36 is preferably fitted/recessed into a second sink-shaped cavity of main body 22 which is preferably realized on the lower face of the plate-like main body 22, roughly beside the main sink-shaped cavity of main body 22, so that the driving shaft 39 of electric motor 36 sticks out from the upper face of main body 22, beside the plate-like upper lid 24, while remaining coaxial to axis A; whereas the pivot shaft 40 of nozzle member 11 sticks out from the plate portion 26 of plate-like upper lid 24 coaxial to axis A, after having engaged in axially rotatable and preferably also axially displaceable manner a through hole realized in the plate portion 26 of plate-like upper lid 24.

With reference to FIGS. 14 and 15, the drive system 38, in turn, is located on the upper face of plate-like main body 22, and preferably comprises a set of toothed wheels 41 which are rotatably fitted/mounted on a number of pivoting pins that sticks out from the upper face of main body 22 while remaining locally substantially perpendicular to the same upper face. The toothed wheels 41 are suitably dimensioned and meshed to one another so as to angularly couple the driving shaft 39 of electric motor 36 to the pivot shaft 40 of nozzle member 11 with a given gear ratio.

In addition to the above, with reference to FIGS. 9, 12 and 13, preferably the electronic control unit 14 of the flow-diverter module 3 comprises a substantially plate-shaped motherboard which is attached to the upper face of plate-like main body 22 above the drive system 38 of electrically-operated motor assembly 13, i.e. above the toothed wheels 41, so as to cover the drive system 38. The outer casing 10 of flow-diverter module 3, in turn, preferably additionally comprises a substantially basin-shaped covering 42 which is attached to the upper face of plate-like main body 22, above the electronic control unit 14, and is suitably shaped/structured to cover and protect both the electronic control unit 14 and the drive system 38 of electrically-operated motor assembly 13.

General operation of the water supply assembly 1 is almost identical to that of the drawer flush circuit of a front-loading home laundry washing machine provided with an internal water softening unit that uses ion-exchange resins to reduce the hardness degree of the tap water directed towards the washing tub, such as for example the laundry washing machine disclosed in WO2013/160211, thus no further explanations are necessary.

As regards the discrete flow-diverter module 3, when the on-off valve 131 of fresh-water supply circuit 108 is opened, the tap water of the water mains reaches the water inlet 16 of flow-diverter module 3, flows through the outer casing 10 bypassing the rotatable flow diverter 11. Via auxiliary water outlet 19, the tap water then reaches the mouth of the internal water channel 6 of plate-like water delivery member 2.

When inside the plate-like water delivery member 2, the tap water flows along the internal water channel 6 up to the water softening device 109, then flows through the water softening device 109 so that its hardness degree is reduced, and finally flows back into the plate-like water delivery member 2.

When again inside the plate-like water delivery member 2, the softened water flows along the internal water channel 7 up to coupling socket 4 and enters again into the flow-diverter module 3 through the auxiliary water inlet 18 that directly communicates with the hollow seat 12. At the hollow seat 12 the softened water then enters into the rotatable flow diverter 11 which, according to its current angular position inside the hollow seat 12, channels the softened water into any one of the water outlets 17 of the flow-diverter module 3, each of which separately communicates with the mouth of a corresponding internal water channel 5, 8 and 9 of plate-like water delivery member 2.

When reaches again the plate-like water delivery member 2, the softened water flows inside the plate-like water delivery member 2 along the selected internal water channel 5, 8 or 9 of plate-like water delivery member 2 up to reach the corresponding water-delivery portion 5a, 8a or 9a of the plate-like water delivery member 2.

On the other hand, when the on-off valve 130 of fresh-water supply circuit 108 is opened, the tap water of the water mains reaches the water inlet 15 of flow-diverter module 3 and flows directly into the hollow seat 12 that accommodates the rotatable flow diverter 11. At hollow seat 12 the unsoftened tap water of the water mains enters into the rotatable flow diverter 11 which, according to its current angular position inside the hollow seat 12, channels the water into any one of the water outlets 17 of flow-diverter module 3, each of which separately communicates with the mouth of a corresponding internal water channel 5, 8 and 9 of the plate-like water delivery member 2.

When reaches the plate-like water delivery member 2 via the water outlet 17, the unsoftened tap water flows inside the plate-like water delivery member 2, along the selected internal water channel 5, 8 or 9 of the plate-like water delivery member 2, up to reach the corresponding water-delivery portion 5a, 8a or 9a of the plate-like water delivery member 2.

The advantages resulting from the particular structure of water supply assembly 1 and of flow diverter module 3 are remarkable.

First of all, splitting the water supply assembly 1 of the detergent dispenser 106, i.e. the drawer flush circuit of the detergent dispenser, into two separate and disconnected modules, namely the plate-like water delivery member 2 and the flow-diverter module 3, allows to reduce overall production costs with respect to today's one-piece water supply assemblies. Furthermore the presence of the auxiliary water inlet 18 increases performances and flexibility of the flow diverter module 3.

Moreover the modular structure of water supply assembly 1 allows an easier and safer quality control of both plate-like water delivery member 2 and flow-diverter module 3.

Last but not least, the modular structure of water supply assembly 1 allows to greatly simplify the piping system of a laundry washing machine having an internal water softening unit, with all advantages concerned. The fresh water arriving from fresh-water supply circuit 108, in fact, flows towards and backwards the water softening device 109 through the plate-like water delivery member 2.

Clearly, changes may be made to the water supply assembly 1 and/or to the laundry washing machine 100 without, however, departing from the scope of the present invention.

For example, rather than being internally provided with a given amount of ion-exchange resins, the water softening device 109 may comprise a flow-through capacitor which uses the electrostatic field to restrain the calcium and magnesium ions ($Ca^{++}$ and $Mg^{++}$) dissolved in the water flowing through the same capacitor, such as the one disclosed in WO2006/079417 and/or EP0861114.

More in detail, the flow-through capacitor comprises reciprocally-faced plates having a conductive surface. The plates are chargeable in response to an applied DC potential. The plates are separated from each other by non-conductive spacers. The plates and the conductive surface on the plates may be constructed from conductive materials such as metals, carbon or conductive polymers or combinations.

Because the plates of the flow through capacitor have a limited capacity, the flow through capacitor requires regeneration, to remove the hardness ions from the flow through capacitor plates. The flow through capacitor may be regenerated by flushing with fresh water, short-circuiting the anode plates with the cathode plates or by reversing the polarity or by a combination thereof. The interval for regeneration is also dependent on the concentration of ions in the feed water; the harder the feed water, the more frequent regeneration is required. The water produced during regeneration contains a high level of hardness (ions) and is therefore directed to a waste outlet. The flow through capacitor thereby provides water softening without the addition of chemicals for regeneration.

Furthermore, in a less sophisticated embodiment of water supply assembly 1 the plate-like water delivery member 2 may be attached/associated to a discrete/separated upper lid of the substantially basin-shaped drawer housing 116 of detergent dispenser 106, so as to be located immediately above the detergent drawer 115 and the regeneration-agent drawer 118 when both drawers are completely inserted/recessed into drawer housing 116.

Figure 16:
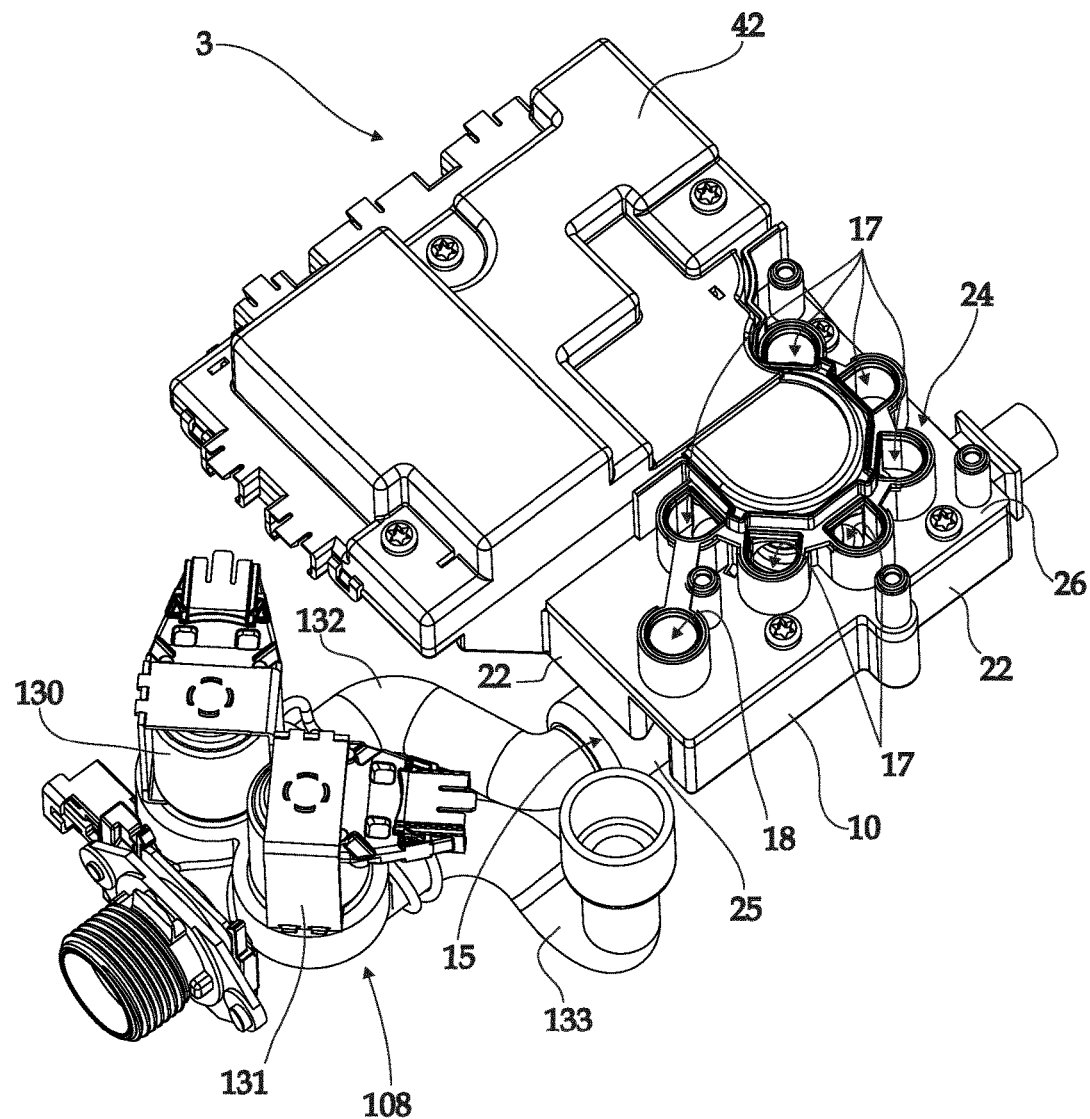

Moreover, with reference to FIG. 16, according to a further alternative embodiment of water supply assembly 1, the flow-diverter module 3 lacks the main water inlet 16 and the corresponding auxiliary water outlet 19. Therefore the flow-diverter module 3 is provided solely with a first main water inlet 15 which is connectable to the fresh-water supply circuit 108 for receiving the fresh water of the water mains, and is structured to channel the water of the fresh-water supply circuit 108 towards the water inlet of the rotatable flow diverter 11; and with an auxiliary water inlet 18 which is connectable to the plate-like water delivery member 2 for receiving the softened fresh water from the water softening device 109.

The plate-like water delivery member 2, in turn, is directly connected to the fresh-water supply circuit 108 for directly receiving fresh water bypassing the flow-diverter module 3, and is structured to directly channel said fresh water to the water inlet 123 of the internal water softening device 109.

More in detail, the plate-like water delivery member 2 is preferably provided with a preferably outwards protruding, auxiliary hydraulic connector (not shown) which is arranged spaced apart from coupling socket 4, and is suitably structured to watertight couple/connect directly with the fresh-water supply circuit 108. Rather than beginning at coupling socket 4, the internal water channel 6 of plate-like water delivery member 2 (i.e. the internal water channel communicating with the water inlet 123 of water softening device 109), in turn, begins at said auxiliary hydraulic connector, so as to directly receive the fresh water of the fresh-water supply circuit 108, and extends inside the body of the water delivery member 2 up to reach the hydraulic connector 6a, which in turn structured to watertight couple with the water inlet 123 of the internal water softening device 109.

In other words, this auxiliary hydraulic connector (not shown) is suitably structured to directly watertight couple with the connecting hosepipe or manifold 133 of the fresh-water supply circuit 108, downstream of on-off valve 131, and the plate-like water delivery member 2 is structured to directly channel the unsoftened fresh water arriving from the fresh-water supply circuit 108 directly towards the water inlet 123 of the internal water softening device 109.

Figure 17:
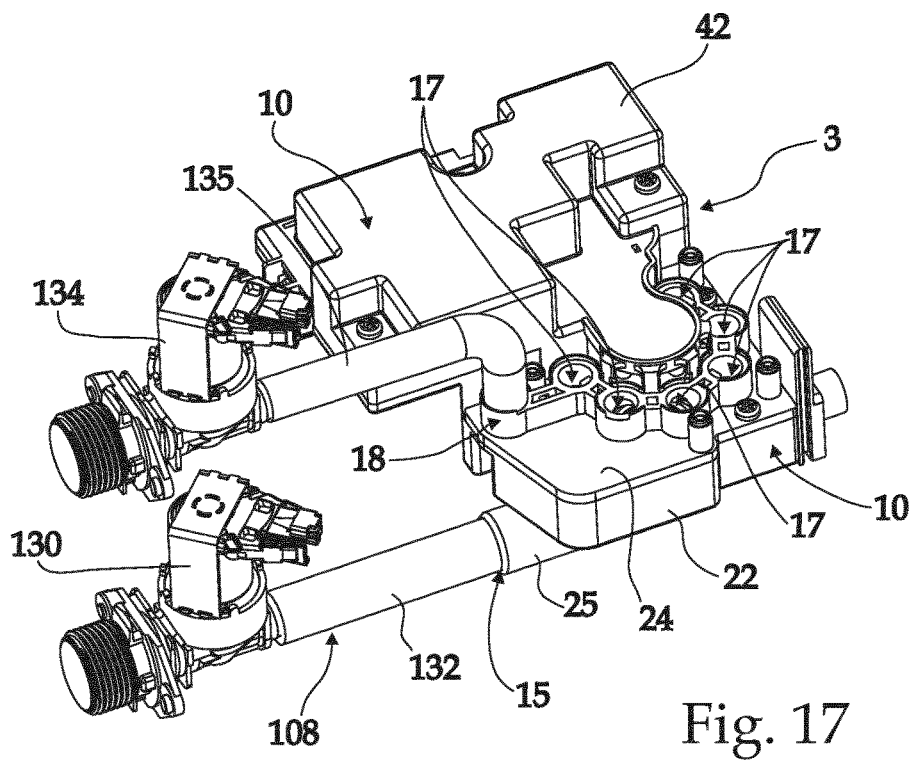
FIGS. 17 and 18 are two perspective views of two further alternative embodiments of the FIG. 9 flow diverter assembly, with parts removed for clarity.

With reference to FIG. 17, according to a further alternative embodiment of the water supply assembly 1, the flow-diverter module 3 lacks the main water inlet 16 and the corresponding auxiliary water outlet 19. Furthermore, rather than being watertight connected to the plate-like water delivery member 2, the auxiliary water inlet 18 of flow-diverter module 3 is separately connected to a further independent electrically-operated, on-off valve 134 of the fresh-water supply circuit 108 preferably via a corresponding connecting hosepipe or manifold 135.

Differently from on-off valves 130 and 131, the on-off valve 134 of fresh-water supply circuit 108, in turn, is preferably connected/connectable to a source of hot water (namely the hot branch of the piping, fittings, and fixtures involved in the distribution and use of water in the domestic building), so as to be able to channel unsoftened hot water to the flow-diverter module 3.

Therefore in this embodiment the flow-diverter module 3 is provided with a first main water inlet 15 which is connectable to the fresh-water supply circuit 108 for receiving the fresh water of the water mains, and is structured to channel the water of the fresh-water supply circuit 108 towards the water inlet of the rotatable flow diverter 11; and with an auxiliary water inlet 18 which is connectable to a different source of fresh water.

As an alternative to this embodiment, rather than being connected directly to the hosepipe or manifold 135, the auxiliary water inlet 18 of flow-diverter module 3 could be connected to the independent electrically-operated, on-off valve 134 of the fresh-water supply circuit 108 via an internal water channel extending inside the plate-like water delivery member 2.

Figure 18:
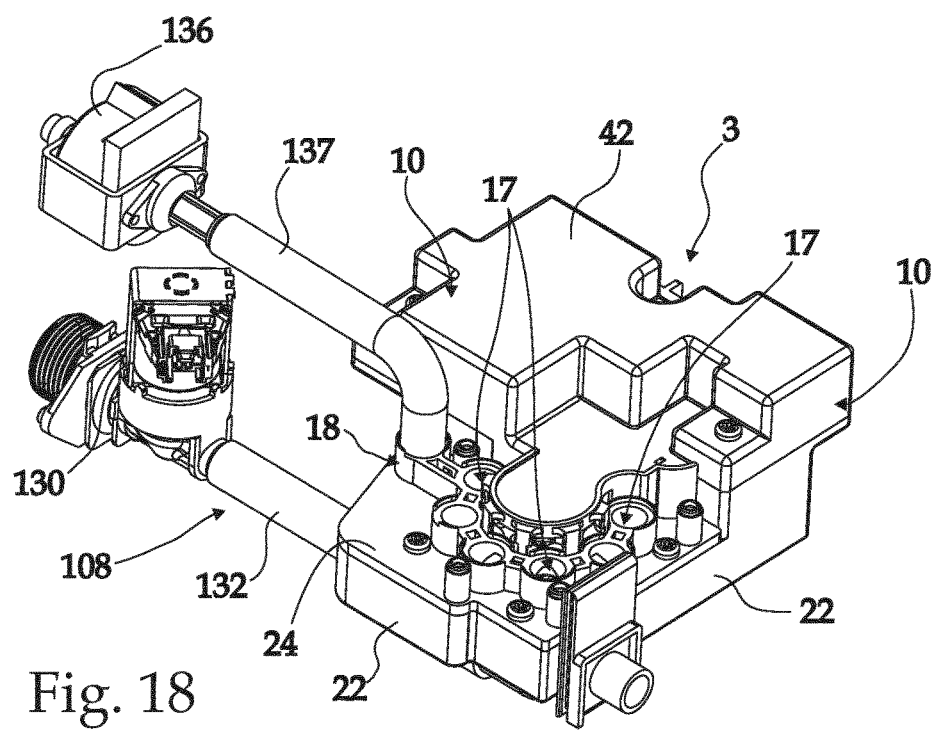

With reference to FIG. 18, according to a still further alternative embodiment of the water supply assembly 1, the flow-diverter module 3 lacks the main water inlet 16 and the corresponding auxiliary water outlet 19. Furthermore, rather than being watertight connected to the plate-like water delivery member 2, the auxiliary water inlet 18 of flow-diverter module 3 is separately connected to a further electrically-operated pump assembly 136 of the laundry washing machine 100 preferably via a corresponding connecting hosepipe or manifold 137.

This electrically-operated pump assembly 136 is structured to selectively such a pre-arranged liquid mixture of water and detergent and/or other washing agent from a tank (not shown) preferably located inside the outer casing 101, and to pump/channel said mixture to the flow-diverter module 3.

Therefore in this embodiment the flow-diverter module 3 is provided with a main water inlet 15 which is connectable to the fresh-water supply circuit 108 for receiving the fresh water of the water mains, and is structured to channel the water of the fresh-water supply circuit 108 towards the water inlet of the rotatable flow diverter 11; and with an auxiliary water inlet 18 which is connectable to a source of washing liquid.

According to a still further non-shown alternative embodiment of water supply assembly 1, the flow-diverter module 3 lacks the main water inlet 16 and the corresponding auxiliary water outlet 19. Furthermore, rather than being watertight connected to the plate-like water delivery member 2, the auxiliary water inlet 18 of flow-diverter module 3 is separately connected to the delivery of an electrically-operated, water circulating pump that such the water from the bottom of washing tub 102, or from the drain sump 126 that extends downwards form the bottom of the washing tub 102, or from the water filtering assembly (not shown) interposed between the drain sump 126 and the suction of the water exhaust pump (not shown) of the laundry washing machine 100.

In addition to the above, according to an alternative non-shown embodiment of flow-diverter module 3, the auxiliary water inlet 18 is located substantially opposite to the interface portion of the outer casing 10 where main water outlets 17 are placed, and is preferably located close to the main water inlet 15 of the same flow-diverter module 3.

Lastly a drawer housing 116 provided with an integral funnel-shaped portion 125 forming a one-piece air break, may be used also in combination with a traditional plate-like water delivery member, such as, for example, a plate-like water delivery member internally accommodating a rotatable flow diverter (such as the one disclosed in EP2562303), or a traditional plate-like water delivery member structured to be watertight coupled/connected to a number of independent electrically-operated, on-off valves, each of which communicates with the water mains and is capable of controlling the flow of fresh water towards a corresponding water-delivery portion of the same plate-like water delivery member.

The invention claimed is:

1. A water supply assembly for a laundry washing machine provided with a detergent drawer which is configured to receive a given amount of detergent, softener or other washing agent and is fitted in an extractable manner into a corresponding drawer housing; the water supply assembly being configured to selectively pour water arriving from a fresh-water supply circuit of the laundry washing machine into the detergent drawer so as to selectively flush the detergent, softener or other washing agent out of the same detergent drawer;

the water supply assembly comprising: a water delivery member which forms or is associated to the upper lid of the drawer housing so as to be located above the detergent drawer when said detergent drawer is inserted/recessed into the drawer housing, and a discrete flow-diverter module which is connectable to the fresh-water supply circuit for receiving the fresh water of the water mains and is attached outside the water delivery member at a coupling socket formed on the water delivery member;

the water delivery member being provided, at said coupling socket, with a number of water inlets each separately communicating with a respective water-delivery portion of the water delivery member;

the flow-diverter module, in turn, being provided with a number of main water outlets configured to separately couple each with a respective water inlet of the water delivery member, and being configured to internally accommodate a rotatable flow diverter which is capable of selectively channeling the water entering into the flow-diverter module towards any one of said main water outlets;

the flow-diverter module being furthermore provided with a first main water inlet and with a second auxiliary water inlet both communicating with a water inlet of the rotatable flow diverter for independently channeling the fresh water of the water mains and/or other washing liquid towards a water inlet of the rotatable flow diverter.

2. The water supply assembly according to claim 1, wherein the flow-diverter module comprises: an outer casing which is separated from the water delivery member, and has an interface portion which is suitably configured to couple with the coupling socket of said water delivery member and wherein the main water outlets are located; a rotatable flow diverter which is fitted/recessed in axially rotatable manner into a hollow seat realized inside said outer casing; and an electrically-operated motor assembly which is associated to the outer casing, and is mechanically connected to the rotatable flow diverter for controlling the angular position of the flow diverter inside said hollow seat.

3. The water supply assembly according to of claim 2, wherein the flow-diverter module furthermore comprises an electronic control unit which is housed inside the outer casing, and is configured to directly power and control the electrically-operated motor assembly according to electric signals arriving from a main electronic central control unit of the laundry washing machine.

4. The water supply assembly according to claim 2, wherein said first main water inlet is configured to couple/connect with the fresh-water supply circuit, and directly communicates with the hollow seat for channeling the water of fresh-water supply circuit towards the water inlet of the rotatable flow diverter.

5. The water supply assembly according to claim 1, wherein said auxiliary water inlet is configured to communicate with a water outlet of a water softening device of the laundry washing machine for receiving softened water.

6. The water supply assembly according to claim 1, wherein the water delivery member is provided with a number of first internal water channels each of which separately begins at coupling socket of the water delivery member and extends inside the body of water delivery member up to reach a corresponding water-delivery portion of the water delivery member.

7. The water supply assembly according to claim 1, wherein the water delivery member is provided with a supplementary water outlet, and in that the auxiliary water inlet of the flow-diverter module is configured to couple/connect with the supplementary water outlet of said water delivery member for receiving water from said water delivery member.

8. The water supply assembly according to claim 7, wherein the supplementary water outlet of the water delivery member is located at coupling socket; and in that the auxiliary water inlet of the flow-diverter module is located at the interface portion of the outer casing.

9. The water supply assembly according to claim 7, wherein the supplementary water outlet of the water delivery member communicates with a water outlet of a water softening device of the laundry washing machine for channeling softened water to the auxiliary water inlet of the flow-diverter module.

10. The water supply assembly according to claim 9, wherein the water delivery member is provided with a second internal water channel which separately begins at coupling socket of the water delivery member, and extends inside the body of the water delivery member up to reach the water outlet of the water softening device of the laundry washing machine.

11. The water supply assembly according to claim 10, wherein said second internal water channel begins at the coupling socket of the water delivery member, and extends inside the body of the water delivery member up to reach a corresponding hydraulic connector located on the water delivery member and which is configured to couple with the water outlet of the water softening device of the laundry washing machine.

12. The water supply assembly according to claim 1, wherein the water delivery member is provided with a second internal water channel which begins at a supplementary water outlet and extends inside the body of the water delivery member up to reach a water source, is configured to reduce the hardness degree of the water arriving from the fresh-water supply circuit; and in that the auxiliary water inlet of the flow-diverter module is configured to couple/connect with the supplementary water outlet of said water delivery member for receiving water from said water source.

13. The water supply assembly according to claim 1, wherein the water delivery member is provided with a supplementary water inlet; and in that the flow-diverter module is provided with an auxiliary water outlet configured to couple/connect with the supplementary water inlet of the water delivery member, and with a second main water inlet which is configured to couple/connect with the fresh-water supply circuit, and which directly communicates with said auxiliary water outlet bypassing the rotatable flow diverter.

14. The water supply assembly according to claim 13, wherein the supplementary water inlet of the water delivery member is located at coupling socket; and in that the auxiliary water outlet of the flow-diverter module is located at the interface portion of the outer casing.

15. The water supply assembly according to claim 13, wherein the supplementary water inlet of the water delivery member communicates with a water inlet of a water softening device of the laundry washing machine for channeling the water towards said water softening device.

16. The water supply assembly according to claim 15, wherein the water delivery member is provided with a third internal water channel which separately begins at coupling socket of the water delivery member, and extends inside the body of the water delivery member up to reach a corresponding hydraulic connector located on the water delivery member and which is configured to couple with the water inlet of the water softening device of the laundry washing machine.

17. The water supply assembly according to claim 1, wherein the water delivery member is directly connected to the fresh-water supply circuit for directly receiving fresh water bypassing the flow-diverter module, and is configured to directly channel said fresh water to a water inlet of an internal water softening device of the laundry washing machine.

18. The water supply assembly according to claim 17, wherein the water delivery member is provided with an auxiliary hydraulic connector which is arranged spaced apart from the coupling socket and is connectable to the fresh-water supply circuit, and with a third internal water channel which begins at said auxiliary hydraulic connector and extends inside the body of the water delivery member up to reach with the water inlet of the water softening device of the laundry washing machine for channeling the fresh water towards the internal water softening device.

19. The water supply assembly according to claim 18, wherein the water delivery member third internal water channel begins at said auxiliary hydraulic connector and extends inside the body of the water delivery member up to reach a further hydraulic connector which is configured to couple with the water inlet of the water softening device of the laundry washing machine.

20. The water supply assembly according to claim 2, wherein the electrically-operated motor assembly comprises an electric motor or other electrically-operated driving device which is fitted/recessed into a corresponding second hollow seat realized in the outer casing, spaced apart beside the hollow seat accommodating the rotatable flow diverter, and a drive system which is configured to mechanically connect the driving shaft of the electric motor to the pivot shaft of the rotatable flow diverter for allowing the electric motor to vary/control the angular position of the flow diverter inside the corresponding hollow seat; the drive system being located into a corresponding compartment of the outer casing preferably located adjacent to the first hollow seat accommodating the rotatable flow diverter and the second hollow seat accommodating the electric motor.

21. The water supply assembly according to claim 2, wherein the outer casing of flow-diverter module comprises a substantially plate-like main body having, on a portion of its upper face, at least a first substantially sink-shaped cavity which is suitably configured to accommodate the rotatable flow diverter; and a plate-like upper lid which is fixed/attached to the flat portion of the upper face of said main body so as to close in watertight manner said first sink-shaped cavity to complete the hollow seat accommodating the rotatable flow diverter; the plate-like upper lid forming the interface portion of the outer casing.

22. The water supply assembly according to claim 1, wherein the detergent drawer is provided with a number of detergent compartments each configured to be fillable with a given amount of detergent, softener or other washing agent; and in that some water-delivery portions of the water delivery member are structured to pour, when the detergent drawer is inserted/recessed into drawer housing, the water arriving from the corresponding water inlets of the water delivery member into the detergent compartments of the detergent drawer.

23. The water supply assembly according to claim 1, wherein the laundry washing machine comprises a regeneration-agent drawer which is configured to be manually fillable with a given amount of consumable salt or other regeneration agent, and is fitted/inserted in manually extractable manner into the drawer housing, by the side of the detergent drawer; and in that at least one of the water-delivery portions of the water delivery member is configured to pour, when the regeneration-agent drawer is inserted/recessed into drawer housing, the water arriving from the corresponding water inlet of the water delivery member into the regeneration-agent drawer.

24. The water supply assembly according to claim 6, wherein the water softening device of the laundry washing machine is internally provided with a given amount of ion-exchange resins or other water softening agent which is capable of restraining the calcium and magnesium ions dissolved in the water flowing through the same water softening device.

25. The water supply assembly according to claim 6, wherein the water softening device of the laundry washing machine is a flow-through capacitor.

26. The water supply assembly according to claim 1, incorporated within said laundry washing machine, said laundry washing machine further comprising an outer casing configured to rest on a floor, a washing tub housed inside the casing, a detergent dispenser which is housed inside the casing and is configured to supply detergent into the washing tub, and said fresh-water supply circuit which is connectable to the water mains and is configured to selectively channel the water from the water mains to said detergent dispenser; the detergent dispenser comprising said detergent drawer which is fitted in extractable manner into the drawer housing.

* * * * *